US012602130B2

(12) United States Patent
Park et al.

(10) Patent No.: US 12,602,130 B2
(45) Date of Patent: Apr. 14, 2026

(54) ELECTRONIC DEVICE

(71) Applicant: Samsung Display Co., Ltd., Yongin-si (KR)

(72) Inventors: Sanghun Park, Yongin-si (KR); Yongsub So, Yongin-si (KR); Byeongkyu Jeon, Yongin-si (KR); Hyeonseo Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/883,930

(22) Filed: Sep. 12, 2024

(65) Prior Publication Data

US 2025/0147622 A1     May 8, 2025

(30) Foreign Application Priority Data

Nov. 8, 2023     (KR) ........................ 10-2023-0153258

(51) Int. Cl.
 *G06F 3/041* (2006.01)
 *G06F 1/16* (2006.01)
 (Continued)
(52) U.S. Cl.
 CPC ........ *G06F 3/04166* (2019.05); *G06F 1/1641* (2013.01); *G06F 1/1652* (2013.01);
 (Continued)
(58) Field of Classification Search
 CPC .... G06F 3/0446; G06F 3/0412; G06F 3/0443; G06F 2203/04111; G06F 1/1652;
 (Continued)

(56) References Cited

U.S. PATENT DOCUMENTS

| | | | |
|---|---|---|---|
| 8,884,917 B2 | 11/2014 | Seo | |
| 2016/0147362 A1* | 5/2016 | Eim | ...................... G06F 3/0416 |
| | | | 345/173 |

(Continued)

FOREIGN PATENT DOCUMENTS

| | | |
|---|---|---|
| KR | 10-2016-0085126 A | 7/2016 |
| KR | 10-1747731 B1 | 6/2017 |

(Continued)

*Primary Examiner* — Dismery Mercedes

(74) *Attorney, Agent, or Firm* — Womble Bond Dickinson (US) LLP

(57) ABSTRACT

An electronic device which includes a display layer that operates in a folded state or an unfolded state and has an active region including a folding region and a plurality of non-folding regions, a sensor layer, and a sensor driver that operates in a charging drive mode to transmit a charging signal to the sensor layer. The sensor layer includes a plurality of first electrodes, a plurality of second electrodes, a plurality of first auxiliary electrodes, and a plurality of second auxiliary electrodes. The sensor driver sequentially provides the charging signal to the plurality of first auxiliary electrodes in a first direction during the charging drive mode, and the number of times that the charging signal is provided in the folded state and the number of times that the charging signal is provided in the unfolded state are different from each other.

18 Claims, 23 Drawing Sheets

(51) Int. Cl.

| | |
|---|---|
| *G06F 3/038* | (2013.01) |
| *G06F 3/044* | (2006.01) |
| *G06F 3/0354* | (2013.01) |

(52) U.S. Cl.
CPC ............. *G06F 3/038* (2013.01); *G06F 3/041* (2013.01); *G06F 3/04162* (2019.05); *G06F 3/0446* (2019.05); *G06F 3/03545* (2013.01); *G06F 2203/04102* (2013.01); *G06F 2203/04106* (2013.01)

(58) Field of Classification Search
CPC . G06F 2203/04102; G06F 2203/04112; G06F 3/04164; G06F 2203/04106; G06F 1/1641; G06F 3/03542; G06F 3/046; G06F 3/0445; G06F 3/04166; G06F 2203/04103; G06F 3/041; G06F 3/03545; G06F 3/038
See application file for complete search history.

(56) References Cited

U.S. PATENT DOCUMENTS

| | | | |
|---|---|---|---|
| 2016/0195990 A1 | 7/2016 | Han et al. | |
| 2017/0108972 A1* | 4/2017 | Kurasawa | ............. G06F 3/0412 |
| 2019/0163314 A1* | 5/2019 | Kim | .................... G06F 3/04164 |
| 2019/0204952 A1* | 7/2019 | Han | ........................ H10K 59/40 |
| 2022/0334700 A1 | 10/2022 | Lim et al. | |
| 2023/0025817 A1 | 1/2023 | Choi et al. | |
| 2023/0215301 A1 | 7/2023 | Kishimoto et al. | |
| 2023/0359303 A1* | 11/2023 | Park | .................... G06F 3/04166 |
| 2024/0045523 A1* | 2/2024 | Kim | .................... G06F 3/03545 |

FOREIGN PATENT DOCUMENTS

| | | |
|---|---|---|
| KR | 10-2022-0143217 A | 10/2022 |
| KR | 10-2023-0016732 A | 2/2023 |
| KR | 10-2023-0104364 A | 7/2023 |

* cited by examiner

FIG. 18

| | 232t | 230ch1 | 230ch2 | 230ch3 | 230ch4 | 230ch5 | 230ch6 | 230ch7 | ... | 233t |
|---|---|---|---|---|---|---|---|---|---|---|
| t1 | SG2 | SG2 | FL | FL | SG1 | SG1 | FL | FL | ... | FL |
| t2 | FL | SG2 | SG2 | FL | FL | SG1 | SG1 | FL | ... | FL |
| t3 | FL | FL | SG2 | SG2 | FL | FL | SG1 | SG1 | ... | FL |
| t4 | FL | FL | FL | SG2 | SG2 | FL | FL | SG1 | ... | FL |
| t5 | FL | FL | FL | FL | SG2 | SG2 | FL | FL | ... | FL |
| ... | ... | ... | ... | ... | ... | ... | ... | ... | ... | ... |
| tn | FL | FL | FL | FL | FL | FL | FL | FL | ... | SG1 |

FIG. 20

|       | 232t | 230ch1 | 230ch2 | 230ch3 | 230ch4 | 230ch5 | 230ch6 |
|-------|------|--------|--------|--------|--------|--------|--------|
| t1-1  | SG2  | SG2    | FL     | FL     | SG1    | SG1    | FL     |
| t2-1  | FL   | SG2    | SG2    | FL     | FL     | SG1    | SG1    |

ELECTRONIC DEVICE

CROSS-REFERENCE TO RELATED APPLICATIONS

The present application claims priority to and the benefit of Korean Patent Application No. 10-2023-0153258, filed on Nov. 8, 2023, in the Korean Intellectual Property Office, the entire disclosure of which is incorporated herein by reference.

BACKGROUND

Aspects of some embodiments of the present disclosure described herein relate to an electronic device with relatively reduced power consumption.

Multimedia electronic devices, such as televisions, mobile phones, tablet computers, notebook computers, car navigation units, game machines, and the like, may include a display device for displaying images. The electronic devices may include a sensor layer (or, an input sensor) capable of providing a touch-based input method that enables a user to intuitively and conveniently input information or instructions, in addition to a conventional input method such as a button, a keyboard, a mouse, or the like. The sensor layer may sense the user's touch or pressure. Meanwhile, pens have been increasingly demanded for users accustomed to inputting information using writing instruments or for accurate touch inputs in specific application programs (e.g., application programs for sketching or drawing).

The above information disclosed in this Background section is only for enhancement of understanding of the background and therefore the information discussed in this Background section does not necessarily constitute prior art.

SUMMARY

Aspects of some embodiments of the present disclosure include an electronic device with relatively reduced power consumption.

According to some embodiments, an electronic device includes a display layer that operates in a folded state or an unfolded state and has an active region including a folding region and a plurality of non-folding regions spaced apart from each other with the folding region therebetween, a sensor layer on the display layer, and a sensor driver that operates in a charging drive mode to transmit a charging signal to the sensor layer. According to some embodiments, the sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, and a plurality of second auxiliary electrodes that are arranged in the second direction and that extend in the first direction and overlap the plurality of second electrodes. According to some embodiments, the sensor driver sequentially provides the charging signal to the plurality of first auxiliary electrodes in the first direction during the charging drive mode, and the number of times that the charging signal is provided in the folded state and the number of times that the charging signal is provided in the unfolded state are different from each other.

According to some embodiments, in the folded state, at least one of the plurality of non-folding regions of the display layer may be exposed to the outside.

According to some embodiments, in the folded state, the display layer may have a first display region, and in the unfolded state, the display layer may have a second display region. According to some embodiments, the second display region may have a larger area than the first display region.

According to some embodiments, in the folded state, the charging signal may not be provided to the plurality of first auxiliary electrodes in a partial area of the active region that does not overlap the first display region.

According to some embodiments, the sensor layer may operate in a first mode to sense a touch or may operate in a second mode to sense an input device. The second mode may include a first sub-mode in which the folded state or the unfolded state of the sensor layer is identified, a second sub-mode that operates in the unfolded state, and a third sub-mode that operates in the folded state.

According to some embodiments, each of the second sub-mode and the third sub-mode may include the charging drive mode.

According to some embodiments, operating time of the second sub-mode may be longer than operating time of the third sub-mode.

According to some embodiments, a folding axis that extends in the second direction may be defined in the folding region. According to some embodiments, the sensor driver may include a folding recognition unit. According to some embodiments, the folding recognition unit may be electrically connected with a first electrode adjacent to the folding axis in the first direction among the plurality of first electrodes.

According to some embodiments, the folding recognition unit may include a driving unit that generates a transmission signal and a sensing unit that receives a reception signal. According to some embodiments, in the first sub-mode, the folding recognition unit may operate as the sensing unit, and in the first mode, the second sub-mode, and the third sub-mode, the folding recognition unit may operate as the driving unit.

According to some embodiments, the number of first auxiliary electrodes to which the charging signal is provided in the folded state may be smaller than the number of first auxiliary electrodes to which the charging signal is provided in the unfolded state.

According to some embodiments, the charging signal may include a first charging signal and a second charging signal, and the first charging signal and the second charging signal may have phases opposite to each other.

According to some embodiments, between at least one first auxiliary electrode to which the first charging signal is provided among the plurality of first auxiliary electrodes and at least one other first auxiliary electrode to which the second charging signal is provided among the plurality of first auxiliary electrodes, at least one of the remaining first auxiliary electrodes may be located.

According to some embodiments, among the plurality of first auxiliary electrodes, at least one first auxiliary electrode to which the first charging signal and the second charging signal are not provided may be floated.

According to some embodiments, an electronic device includes a display layer that operates in a folded state or an unfolded state and has an active region including a folding region and a plurality of non-folding regions spaced apart from each other with the folding region therebetween, a sensor layer on the display layer, and a sensor driver that operates in a charging drive mode to transmit a charging signal to the sensor layer. According to some embodiments, the sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, and a plurality of second auxiliary electrodes that are arranged in the second direction and that extend in the first direction and overlap the plurality of second electrodes. According to some embodiments, the number of first auxiliary electrodes to which the charging signal is provided in the folded state is smaller than the number of first auxiliary electrodes to which the charging signal is provided in the unfolded state.

According to some embodiments, in the folded state, at least one of the plurality of non-folding regions of the display layer may be exposed to the outside.

According to some embodiments, in the folded state, the display layer may have a first display region, and in the unfolded state, the display layer may have a second display region. According to some embodiments, the second display region may have a larger area than the first display region.

According to some embodiments, in the folded state, the charging signal may not be provided to the plurality of first auxiliary electrodes in a partial area of the active region that does not overlap the first display region.

According to some embodiments, the charging signal may include a first charging signal and a second charging signal, and the first charging signal and the second charging signal may have phases opposite to each other.

According to some embodiments, between at least one first auxiliary electrode to which the first charging signal is provided among the plurality of first auxiliary electrodes and at least one other first auxiliary electrode to which the second charging signal is provided among the plurality of first auxiliary electrodes, at least one of the remaining first auxiliary electrodes may be located.

According to some embodiments, among the plurality of first auxiliary electrodes, at least one first auxiliary electrode to which the first charging signal and the second charging signal are not provided may be floated.

BRIEF DESCRIPTION OF THE FIGURES

The above and other aspects and features of the present disclosure will become apparent by describing in more detail aspects of some embodiments thereof with reference to the accompanying drawings.

FIG. 18 is a table showing signals provided to the sensor layer according to some embodiments of the present disclosure.

FIG. 20 is a table showing signals provided to the sensor layer according to some embodiments of the present disclosure.

DETAILED DESCRIPTION

Figure 1:
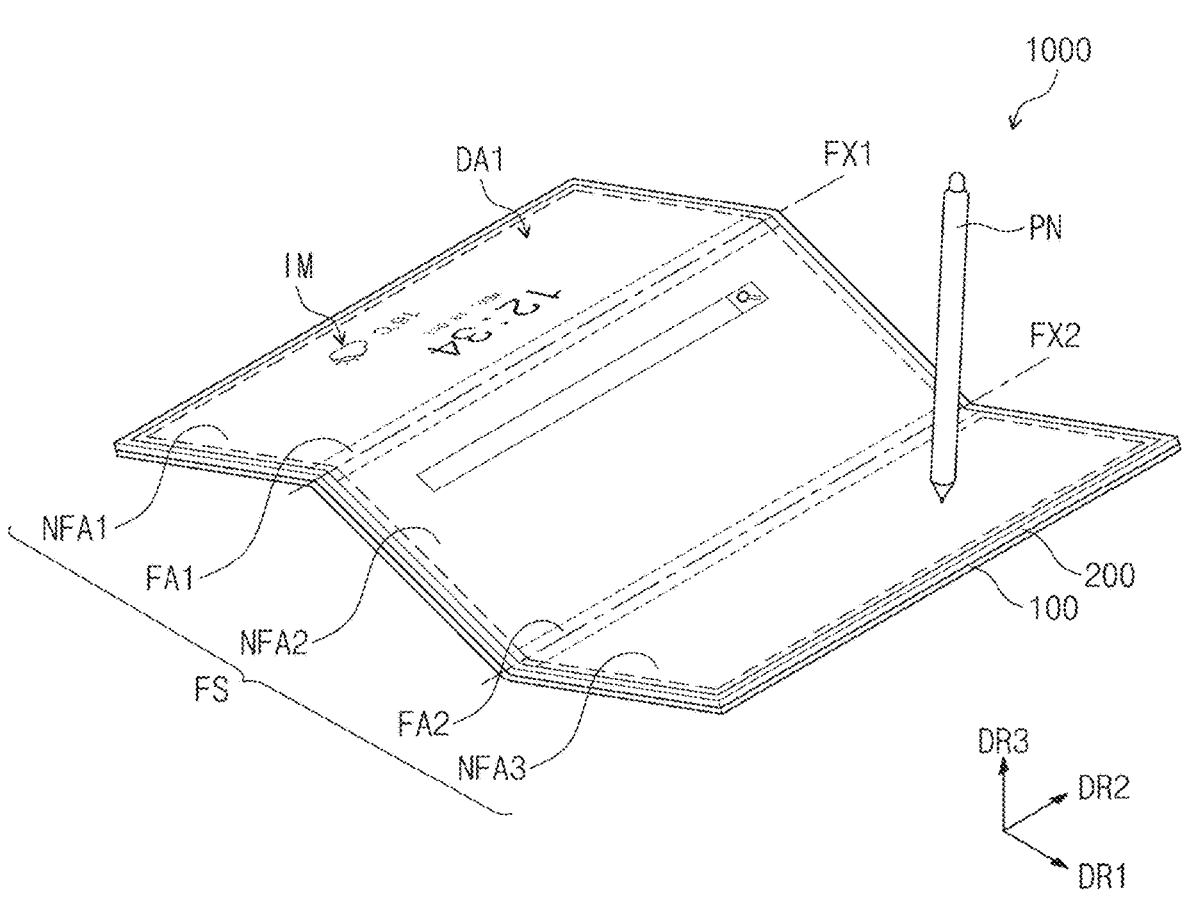
FIG. 1 is a perspective view of an electronic device according to some embodiments of the present disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

Figure 2:
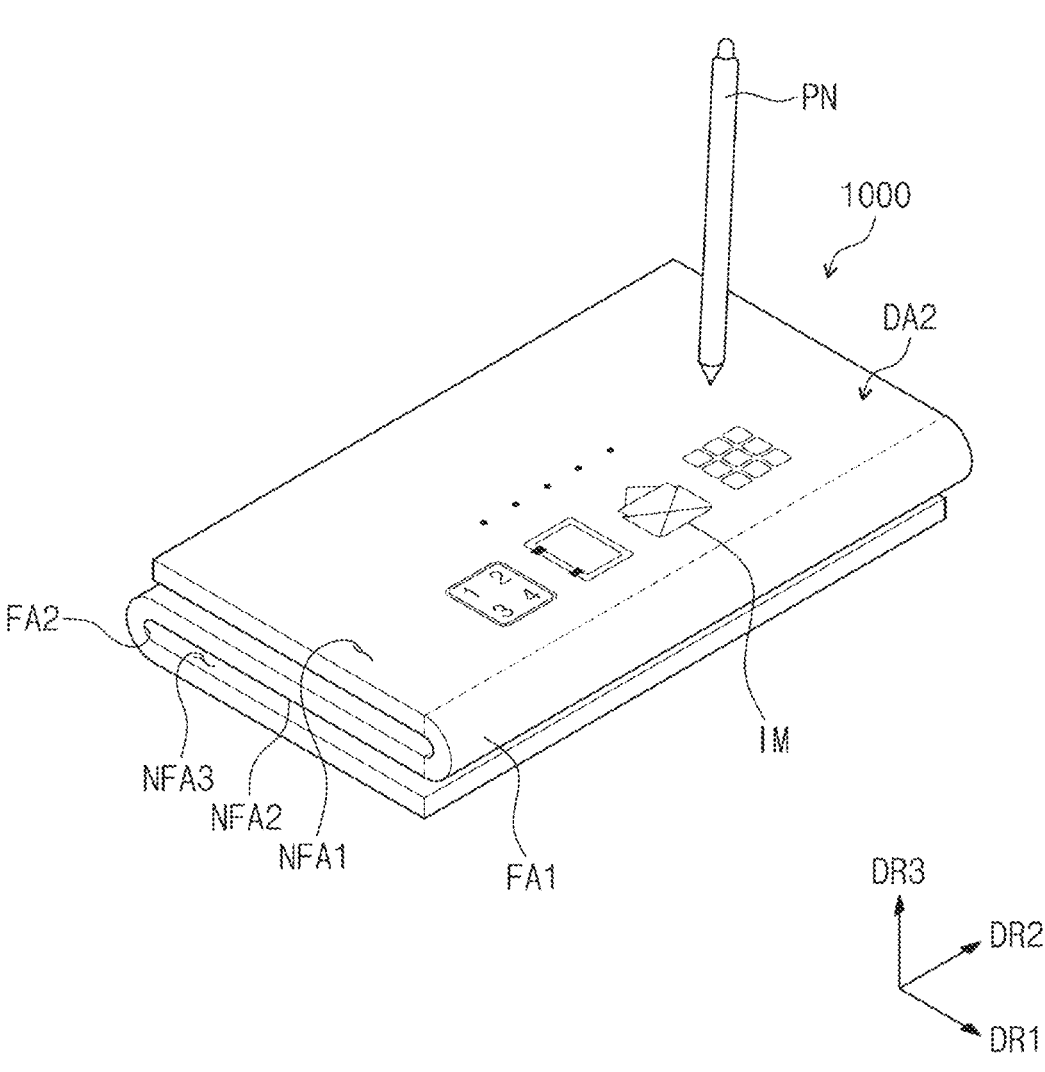
FIG. 2 is a perspective view of the folded electronic device according to some embodiments of the present disclosure.

FIG. 1 is a perspective view of an electronic device according to some embodiments of the present disclosure, and FIG. 2 is a perspective view of the folded electronic device according to some embodiments of the present disclosure.

Referring to FIGS. 1 and 2, the electronic device 1000 may be a device activated depending on an electrical signal. The electronic device 1000 may include various embodiments. For example, the electronic device 1000 may include a tablet computer, a notebook computer, a computer, a smart television, or the like. In the present disclosure, the electronic device 1000 is illustrated as a smart phone, but embodiments according to the present disclosure are not limited thereto.

The electronic device 1000 may include a display layer 100 and a sensor layer 200 located on the display layer 100. An active region FS may be defined in the display layer 100. The display layer 100 may operate in a folded state or an unfolded state. The display layer 100 may generate an image IM and may provide the image IM to a user. The image IM may include a still image (e.g., static images) as well as a dynamic image (e.g., video images). In FIGS. 1 and 2, an Internet search window and a clock window are illustrated as an example of the image IM. The sensor layer 200 may sense an external input device PN. The input device PN may be referred to as a pen PN.

Although FIG. 1 illustrates the partially folded electronic device 1000 to show the foldable electronic device 1000, the electronic device 1000 according to some embodiments of the present disclosure may be unfolded, and the active region FS may have a flat shape.

When the electronic device 1000 is unfolded, the active region FA may be parallel to a plane defined by a first direction DR1 and a second direction DR2. When the electronic device 1000 is unfolded, the normal direction of the active region FS, that is, the thickness direction of the electronic device 1000 may be indicated by a third direction DR3. The electronic device 1000 may display the image IM. Front surfaces (or, upper surfaces) and rear surfaces (or, lower surfaces) of respective members may be distinguished from each other based on the third direction DR3. The expressions "when viewed from above the plane" or "in a plan view" used herein may refer to a perspective viewed from the third direction DR3.

The electronic device 1000 may sense an external input applied from the outside. The external input may be a user input. The user input may include various types of inputs such as a part of the user's body, an electro-magnetic pen PN (or stylus), light, heat, pressure, or the like.

For example, the external input may include not only a touch of a part of the user's body (e.g., the user's hand) on the electronic device 1000 but also an external input (e.g., hovering) that is applied in proximity to the electronic device 1000 or applied adjacent to the electronic device 1000 at a certain distance. Furthermore, the external input may have various types such as force, pressure, temperature, light, and the like. The electronic device 1000 according to the present disclosure may also sense an external input by the pen PN that generates a magnetic field. The pen PN may be referred to as an input device PN. In addition, the electronic device 1000 may sense a plurality of inputs of different types. For example, the electronic device 1000 may sense an external input through the input device PN and an external input through the user's hand.

In FIG. 1, an external input through the input device PN is illustrated as an example. According to some embodiments, the input device PN may be attached inside the electronic device 1000 or on the exterior of (e.g., external with respect to) the electronic device 1000 and may be detached from (e.g., a separate component from) the electronic device 1000. The electronic device 1000 may provide and receive signals corresponding to the attachment and detachment of the input device PN.

The display layer 100 and the sensor layer 200 according to some embodiments of the present disclosure may be folded about a plurality of folding axes without damaging the electronic device 1000. For example, a virtual first folding axis FX1 and a virtual second folding axis FX2 that extend in the second direction DR2 may be defined in the display layer 100. The first folding axis FX1 and the second folding axis FX2 may be spaced apart from each other in the first direction DR1.

The active region FS may include a first folding region FA1, a second folding region FA2, a first non-folding region NFA1, a second non-folding region NFA2, and a third non-folding region NFA3. The first folding region FA1 and the second folding region FA2 may be folded about the first folding axis FX1 and the second folding axis FX2, respectively. The first non-folding region NFA1 and the second non-folding region NFA2 may be spaced apart from each other in the first direction DR1 with the first folding region FA1 therebetween, and the second non-folding region NFA2 and the third non-folding region NFA3 may be spaced apart from each other in the first direction DR1 with the second folding region FA2 therebetween.

The electronic device 1000 may be folded about the first folding axis FX1 in an out-folding manner. Accordingly, the display layer 100 may be folded such that the first non-folding region NFA1 and the second non-folding region NFA2 face away from each other with respect to the first folding axis FX1 and the first folding region FA1 is convex toward the first folding axis FX1. Furthermore, the electronic device 1000 may be folded about the second folding axis FX2 in an in-folding manner. Accordingly, the display layer 100 may be folded such that the second non-folding region NFA2 and the third non-folding region NFA3 face each other and the second folding region FA2 surrounds the second folding axis FX2.

In the unfolded state, the display layer 100 may have a first display region DA1 corresponding to the active region FS, and in the folded state, the display layer 100 may have a second display region DA2 corresponding to the first non-folding region NFA1. In this case, the first display region DA1 may have a larger area than the second display region DA2. In the unfolded state, the electronic device 1000 may provide more information to the user. In the folded state, the user's portability for the electronic device 1000 may be relatively improved.

Figure 3:
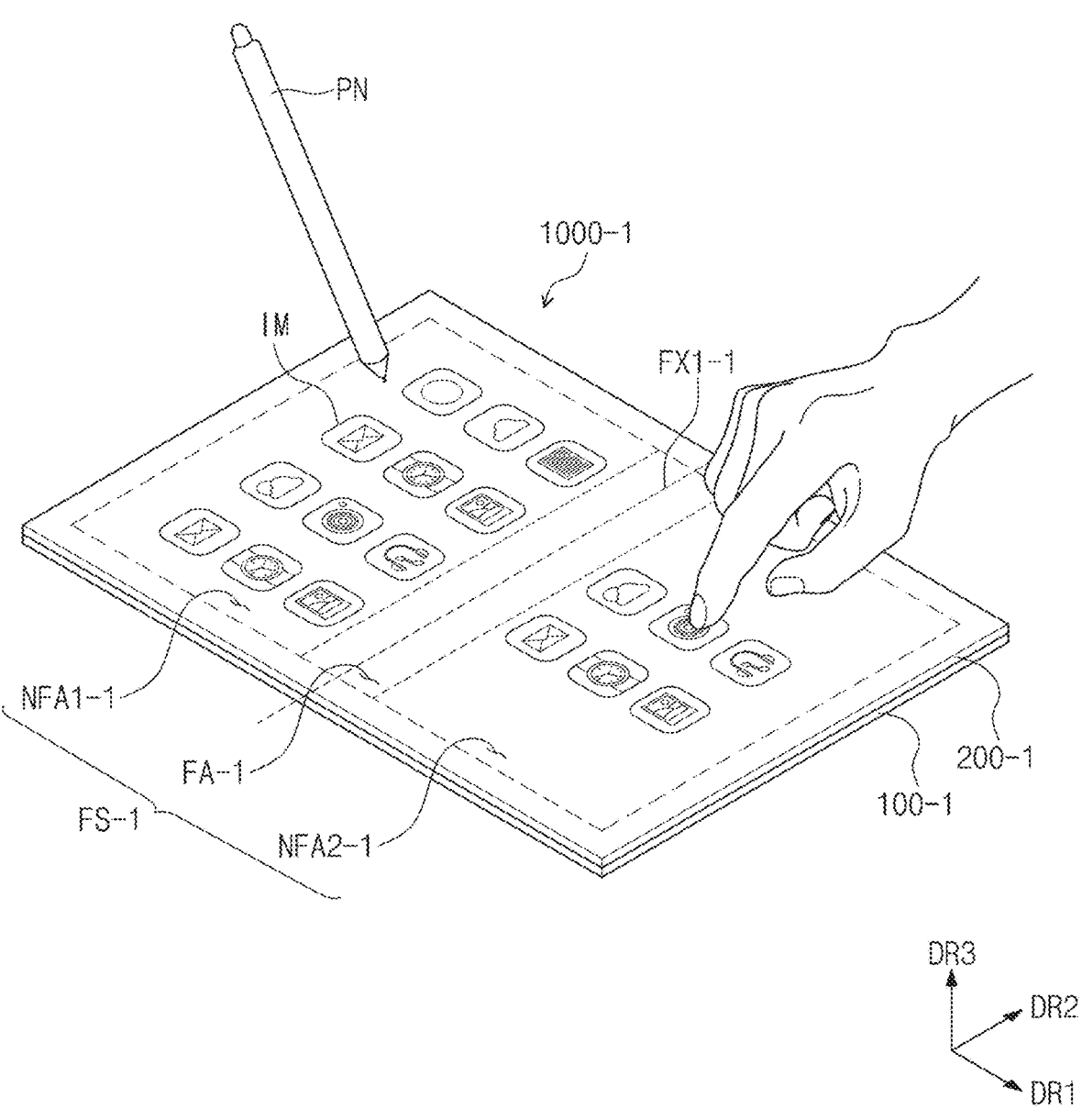
FIG. 3 is a perspective view of an electronic device according to some embodiments of the present disclosure.
Figure 4:
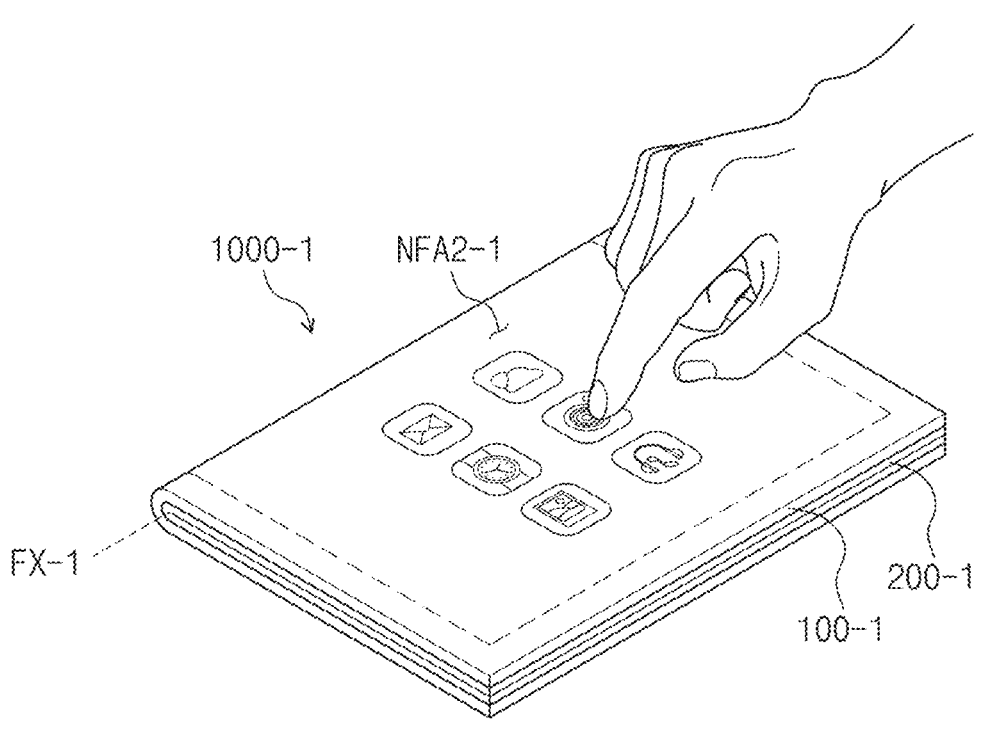
FIG. 4 is a perspective view of the out-folded electronic device according to some embodiments of the present disclosure.
Figure 4:
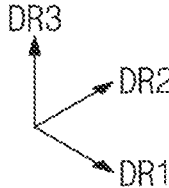

FIG. 3 is a perspective view of an electronic device according to some embodiments of the present disclosure, and FIG. 4 is a perspective view of the out-folded electronic device according to some embodiments of the present disclosure. In describing FIGS. 3 and 4, components identical to the components described with reference to FIGS. 1 and 2 will be assigned with identical reference numerals, and some repeated descriptions thereof may be omitted.

Referring to FIGS. 3 and 4, the electronic device 1000-1 may include a display layer 100-1 and a sensor layer 200-1 located on the display layer 100-1. An active region FS-1 may be defined in the display layer 100-1. The display layer 100-1 may operate in a folded state or an unfolded state.

The display layer 100-1 and the sensor layer 200-1 according to some embodiments of the present disclosure may be folded. For example, a virtual folding axis FX-1 extending in the second direction DR2 may be defined in the display layer 100-1.

The active region FS-1 may include a folding region FA-1, a first non-folding region NFA1-1, and a second non-folding region NFA2-1. The folding region FA-1 may be folded about the folding axis FX-1, and the first non-folding region NFA1-1 and the second non-folding region NFA2-1 may be spaced apart from each other in the first direction DR1 with the folding region FA-1 therebetween.

The electronic device 1000-1 may be folded about the folding axis FX-1 in an out-folding manner. Accordingly, the electronic device 1000-1 may be folded such that the first non-folding region NFA1-1 and the second non-folding region NFA2-1 face away from each other with respect to the folding axis FX-1 and the folding region FA-1 is convex toward the folding axis FX-1.

In the unfolded state, the display layer 100-1 may have a first display region corresponding to the active region FS-1, and in the folded state, the display layer 100-1 may have a second display region corresponding to the first non-folding region NFA1-1. In this case, the first display region may have a larger area than the second display region.

Figure 5:
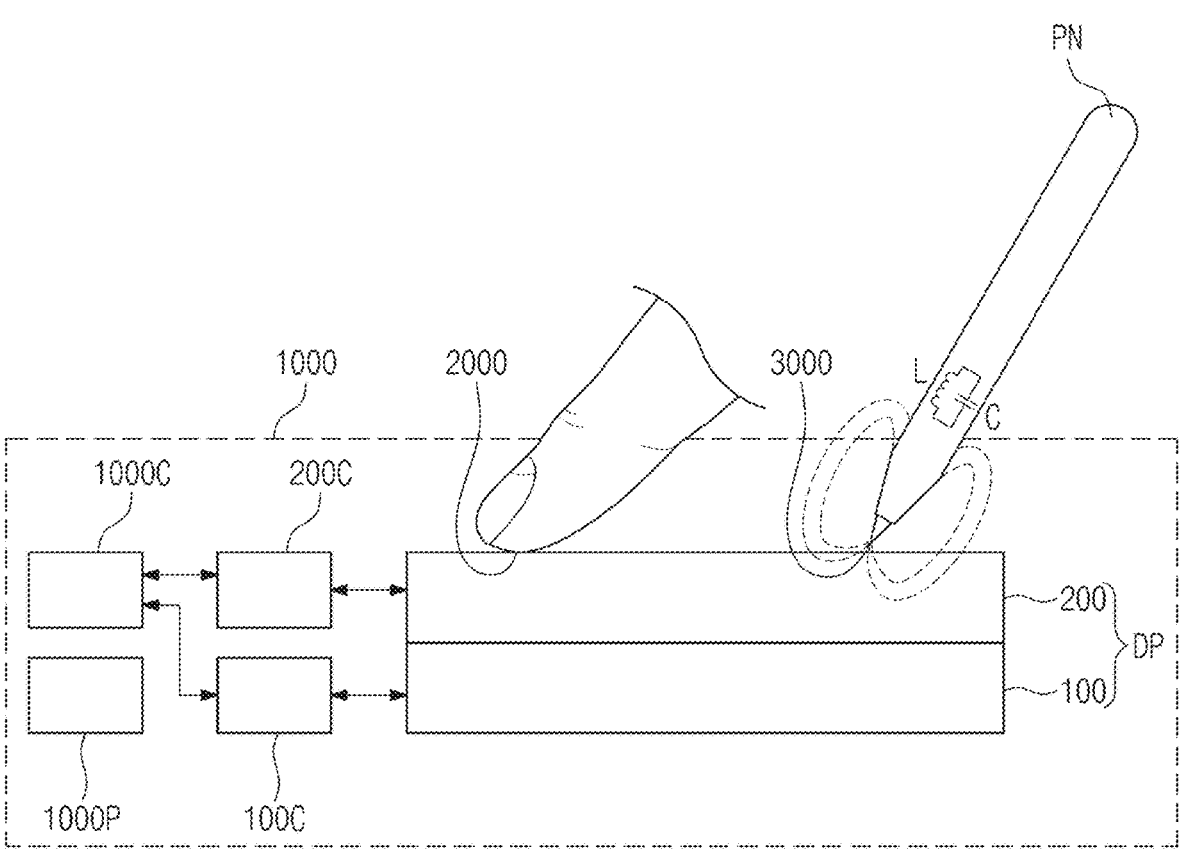
FIG. 5 is a schematic view for explaining an operation of an electronic device according to some embodiments of the present disclosure.

FIG. 5 is a schematic view for explaining an operation of the electronic device 1000 according to some embodiments of the present disclosure.

Referring to FIG. 5, the electronic device 1000 may include a display panel DP, a display driver 100C, a sensor driver 200C, a main driver 1000C, and a power circuit 1000P.

The display panel DP may include the display layer 100 and the sensor layer 200.

The display layer 100 may be a component that generates (or substantially generates) the image IM (refer to FIG. 1). The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer.

The sensor layer 200 may be located on the display layer 100. The sensor layer 200 may sense a first input 2000 or a second input 3000 applied from the outside. Each of the first input 2000 and the second input 3000 may be an input means capable of providing a change in the capacitance of the sensor layer 200 or an input means capable of causing an induced current in the sensor layer 200. For example, the first input 2000 may be a passive input means such as a part of the user's body (e.g., a user's finger). The second input 3000 may be an input by the pen PN or an input by an RFIC tag. For example, the pen PN may be a passive pen or an active pen.

According to some embodiments of the present disclosure, the pen PN may be a device that generates a magnetic field having a certain resonant frequency. The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. According to some embodiments of the present disclosure, the RLC resonance circuit may be a variable resonance circuit that varies the resonant frequency. In this case, the inductor L may be a variable inductor, and/or the capacitor C may be a variable capacitor. However, embodiments according to the present disclosure are not particularly limited thereto.

The inductor L generates a current by a magnetic field formed in the sensor layer 200. However, embodiments according to the present disclosure are not particularly limited thereto. For example, when the pen PN operates in an active type, the pen PN may generate a current even though a magnetic field is not provided to the pen PN from the outside. The generated current is transferred to the capacitor C. The capacitor C charges the current input from the inductor L and discharges the charged current to the inductor L. Thereafter, the inductor L may emit a magnetic field having a resonant frequency. An induced current may flow in the sensor layer 200 by the magnetic field emitted from the pen PN. The induced current may be transferred to the sensor driver 200C as a reception signal (or, a sensing signal or a signal).

The main driver 1000C may control overall operation of the electronic device 1000. For example, the main driver 1000C may control operations of the display driver 100C and the sensor driver 200C. The main driver 1000C may include at least one microprocessor and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C may be implemented with an integrated circuit (IC) and may be electrically connected with the sensor layer 200. For example, the sensor driver 200C may be directly mounted on a certain region of the display panel DP or may be mounted on a separate printed circuit board using a chip on film (COF) method and may be electrically connected with the sensor layer 200.

The sensor driver 200C and the sensor layer 200 may selectively operate in a first mode or a second mode. For example, the first mode may be a mode for sensing a touch input, for example, the first input 2000. The second mode may be a mode for sensing an input of the pen PN, for example, the second input 3000. The first mode may be referred to as a touch sensing mode, and the second mode may be referred to as a pen sensing mode.

Switching between the first mode and the second mode may be performed in various ways. For example, the sensor driver 200C and the sensor layer 200 may be driven in the first mode and the second mode in a time-division manner and may sense the first input 2000 or the second input 3000. Alternatively, the switching between the first mode and the second mode may be performed by the user's selection or the user's specific action, or by activating or deactivating a specific application, one of the first mode and the second mode may be activated or deactivated or the driving mode may switch from one mode to the other mode. In another case, while the sensor driver 200C and the sensor layer 200 alternately operate in the first mode and the second mode, when the first input 2000 is sensed, the sensor driver 200C and the sensor layer 200 may remain in the first mode, and when the second input 3000 is sensed, the sensor driver 200C and the sensor layer 200 may remain in the second mode.

The sensor driver 200C may calculate coordinate information of an input based on a signal received from the sensor layer 200 and may provide a coordinate signal having the coordinate information to the main driver 1000C. The main driver 1000C executes an operation corresponding to the user input, based on the coordinate signal. For example, the main driver 1000C may operate the display driver 100C such that a new application image is displayed on the display layer 100.

The power circuit 1000P may include a power management integrated circuit (PMIC). The power circuit 1000P may generate a plurality of drive voltages for driving the display layer 100, the sensor layer 200, the display driver 100C, and the sensor driver 200C. For example, the plurality of drive voltages may include a gate high-voltage, a gate low-voltage, a first drive voltage (e.g., an ELVSS voltage), a second drive voltage (e.g., an ELVDD voltage), an initialization voltage, and the like, but are not particularly limited to the examples.

Figure 6:
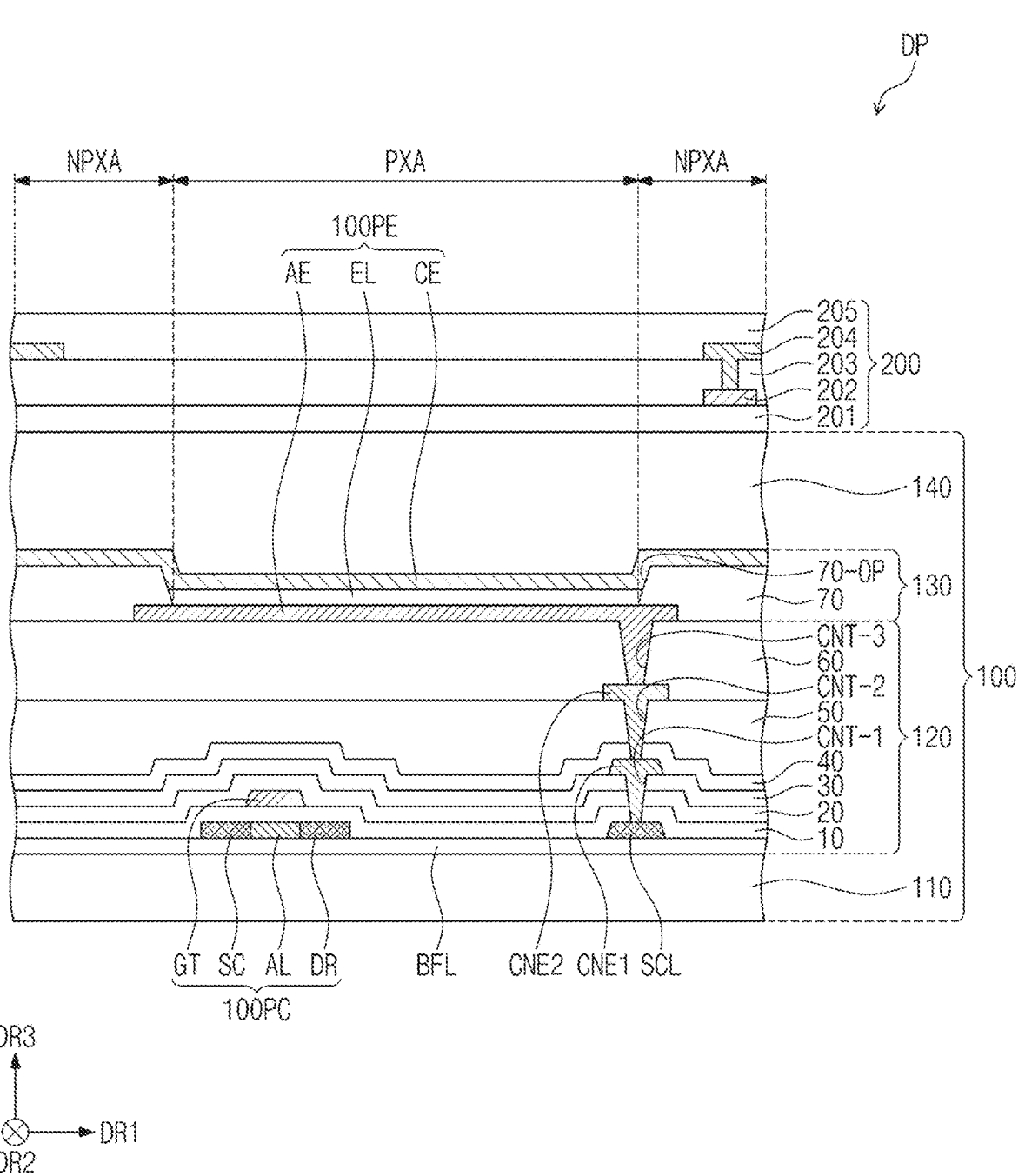
FIG. 6 is a sectional view of a display panel according to some embodiments of the present disclosure.

FIG. 6 is a sectional view of the display panel according to some embodiments of the present disclosure.

Referring to FIG. 6, the display layer 100 may include a base layer 110, a circuit layer 120, a light emitting element layer 130, and an encapsulation layer 140.

The base layer 110 may be a member that provides a base surface on which the circuit layer 120 is located. The base layer 110 may have a multi-layer structure or a single-layer structure. The base layer 110 may be a glass substrate, a metal substrate, a silicon substrate, or a polymer substrate, but embodiments according to the present disclosure are not particularly limited thereto.

The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 by a process such as coating or deposition and may be selectively subjected to patterning by performing a photolithography process a plurality of times.

At least one buffer layer BFL is formed on the upper surface of the base layer 110. The buffer layer BFL may relatively improve a coupling force between the base layer 110 and a semiconductor pattern SC, AL, DR, and SCL. The buffer layer BFL may be formed of multiple layers. Alternatively, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be located on the buffer layer BFL. The semiconductor pattern SC, AL, DR, and SCL may include poly silicon. However, without being limited thereto, the semiconductor pattern SC, AL, DR, and SCL may include amorphous silicon, low-temperature polycrystalline silicon, or an oxide semiconductor.

FIG. 6 illustrates only a portion of the semiconductor pattern SC, AL, DR, and SCL, and the semiconductor pattern SC, AL, DR, and SCL may be additionally located in other regions. The semiconductor pattern SC, AL, DR, and SCL may be arranged over pixels according to a specific rule. The semiconductor pattern SC, AL, DR, and SCL may have different electrical properties depending on whether doping is performed or not. The semiconductor pattern SC, AL, DR, and SCL may include first regions SC, DR, and SCL having a high conductivity and a second region AL having a low conductivity. The first regions SC, DR, and SCL may be doped with an N-type dopant or a P-type dopant. A P-type transistor may include a doped region that is doped with a P-type dopant, and an N-type transistor may include a doped region that is doped with an N-type dopant. The second region AL may be an un-doped region, or may be a region more lightly doped than the first regions SC, DR, and SCL.

The first regions SC, DR, and SCL may have a higher conductivity than the second region AL and may substantially serve as electrodes or signal lines. The second region AL may substantially correspond to an active region AL (or, a channel) of a transistor 100PC. In other words, one portion AL of the semiconductor pattern SC, AL, DR, and SCL may be the active region AL of the transistor 100PC, another portion SC or DR of the semiconductor pattern SC, AL, DR, and SCL may be a source region SC or a drain region DR of the transistor 100PC, and the other portion SCL of the semiconductor pattern SC, AL, DR, and SCL may be a connecting electrode or a connecting signal line SCL.

Figure 8:
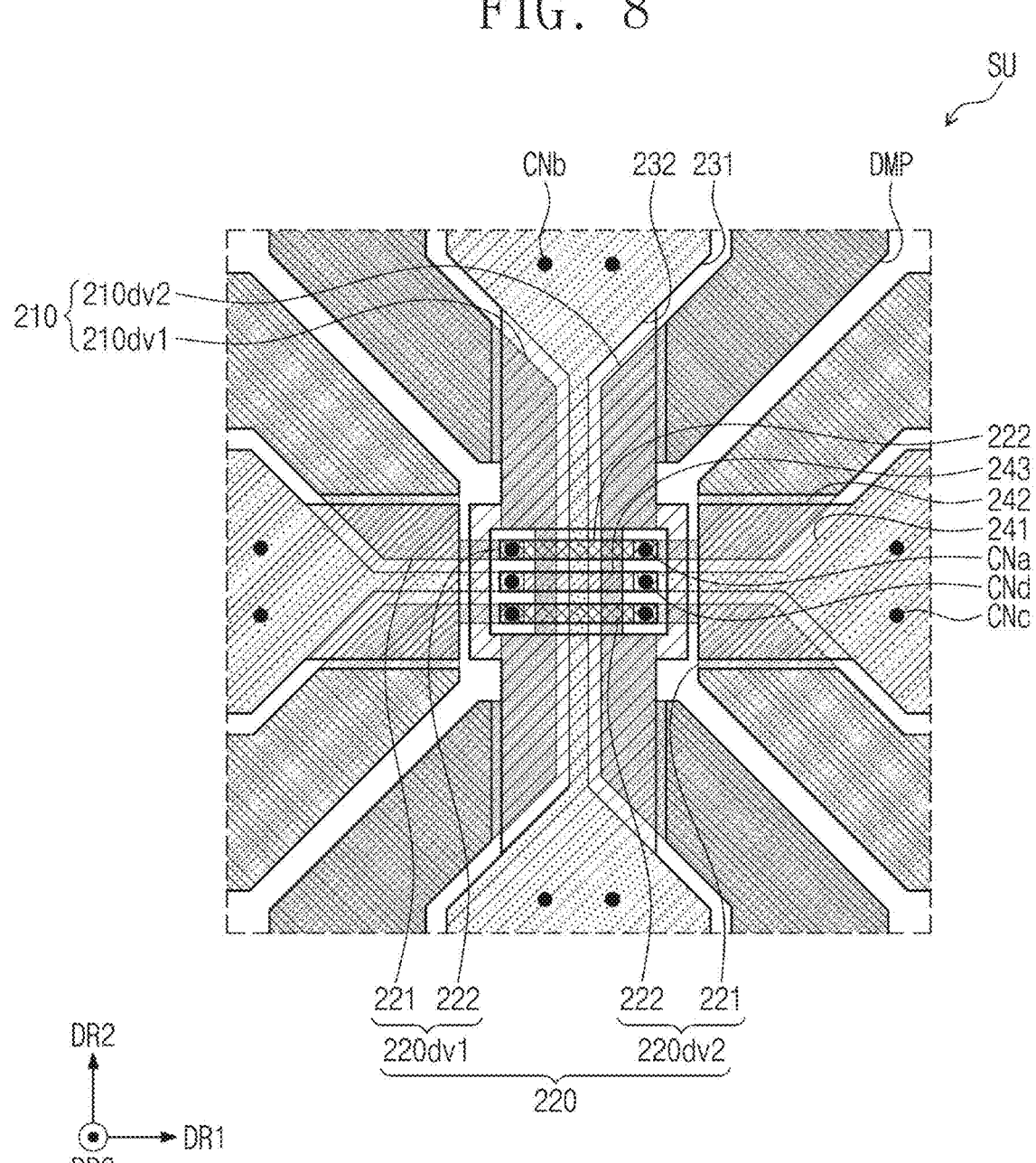
FIG. 8 is an enlarged plan view illustrating one sensing unit according to some embodiments of the present disclosure.

Each of the pixels may have an equivalent circuit including seven transistors, one capacitor, and a light emitting element, and the equivalent circuit of the pixel may be modified in various forms. In FIG. 8, one transistor 100PC and a light emitting element 100PE included in the pixel are illustrated as an example.

The source region SC, the active region AL, and the drain region DR of the transistor 100PC may be formed from the semiconductor pattern SC, AL, DR, and SCL. The source region SC and the drain region DR may extend from the active region AL in opposite directions on the section. In FIG. 8, a portion of the connecting signal line SCL formed from the semiconductor pattern SC, AL, DR, and SCL is illustrated. Although not separately illustrated, the connecting signal line SCL may be connected to the drain region DR of the transistor 100PC when viewed from above the plane (e.g., in a plan view).

A first insulating layer 10 may be located on the buffer layer BFL. The first insulating layer 10 may commonly overlap the plurality of pixels and may cover the semiconductor pattern SC, AL, DR, and SCL. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy nitride, zirconium oxide, or hafnium oxide. According to some embodiments, the first insulating layer 10 may be a single silicon oxide layer. Not only the first insulating layer 10 but also insulating layers of the circuit layer 120 that will be described below may be inorganic layers and/or organic layers and may have a single-layer structure or a multi-layer structure. The inorganic layers may include at least one of the aforementioned materials, but are not limited thereto.

A gate GT of the transistor 100PC is located on the first insulating layer 10. The gate GT may be a portion of a metal pattern. The gate GT overlaps the active region AL. The gate GT may function as a mask in a process of doping or relatively reducing the semiconductor pattern SC, AL, DR, and SCL.

A second insulating layer 20 may be located on the first insulating layer 10 and may cover the gate GT. The second insulating layer 20 may commonly overlap the pixels. The second insulating layer 20 may be an inorganic layer and/or an organic layer and may have a single-layer structure or a multi-layer structure. The second insulating layer 20 may include at least one of silicon oxide, silicon nitride, or silicon oxy nitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connecting electrode CNE1 may be located on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connecting electrode CNE2 may be located on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be located on the fifth insulating layer 50 and may cover the second connecting electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, it will be illustrated and described in the context of the light emitting element 100PE being an organic light emitting element. However, embodiments according to the present disclosure are not particularly limited thereto.

The light emitting element 100PE may include a first electrode AE, an emissive layer EL, and a second electrode CE.

The first electrode AE may be located on the sixth insulating layer 60. The first electrode AE may be connected to the second connecting electrode CNE2 through a contact hole CNT-3 penetrating the sixth insulating layer 60.

A pixel defining layer 70 may be located on the sixth insulating layer 60 and may cover a portion of the first electrode AE. The pixel defining layer 70 may have an opening 70-OP defined therein. The opening 70-OP of the pixel defining layer 70 exposes at least a portion of the first electrode AE.

The active region FS (refer to FIG. 1) may include an emissive region PXA and a non-emissive region NPXA adjacent to the emissive region PXA. The non-emissive region NPXA may surround the emissive region PXA. According to some embodiments, the emissive region PXA is defined to correspond to a partial region of the first electrode AE exposed through the opening 70-OP.

The emissive layer EL may be located on the first electrode AE. The emissive layer EL may be located in a region corresponding to the opening 70-OP. That is, the emissive layer EL may be separately formed for each of the pixels. When the emissive layer EL is separately formed for each of the pixels, the emissive layers EL may each emit at least one of blue light, red light, or green light. However, without being limited thereto, the emissive layer EL may be connected to the pixels and may be commonly included in the pixels. In this case, the emissive layer EL may provide blue light or white light.

The second electrode CE may be located on the emissive layer EL. The second electrode CE may have a one-body shape and may be commonly included in the plurality of pixels.

According to some embodiments of the present disclosure, a hole control layer may be located between the first electrode AE and the emissive layer EL. The hole control layer may be commonly located in the emissive region PXA and the non-emissive region NPXA. The hole control layer may include a hole transport layer and may further include a hole injection layer. An electron control layer may be located between the emissive layer EL and the second electrode CE. The electron control layer may include an electron transport layer and may further include an electron injection layer. The hole control layer and the electron control layer may be commonly formed for the plurality of pixels by using an open mask or an ink-jet process.

The encapsulation layer 140 may be located on the light emitting element layer 130. The encapsulation layer 140 may include an inorganic layer, an organic layer, and an inorganic layer sequentially stacked one above another. However, layers constituting the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but embodiments according to the present disclosure are not limited thereto.

The sensor layer 200 may include a base layer 201, a first conductive layer 202, a sensing insulation layer 203, a second conductive layer 204, and a cover insulation layer 205.

The base layer 201 may be an inorganic layer including at least one of silicon nitride, silicon oxy nitride, or silicon oxide. Alternatively, the base layer 201 may be an organic layer including an epoxy resin, an acrylic resin, or an imide-based resin. The base layer 201 may have a single-layer structure, or may have a multi-layer structure stacked in the third direction DR3.

Each of the first conductive layer 202 and the second conductive layer 204 may have a single-layer structure, or may have a multi-layer structure stacked in the third direction DR3.

Each of the first conductive layer 202 and the second conductive layer 204 that have a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as poly(3,4-ethylenedioxythiophene) (PEDOT), a metal nano wire, or graphene.

Each of the first conductive layer 202 and the second conductive layer 204 that have a multi-layer structure may include metal layers. The meal layers may have, for example, a three-layer structure of titanium/aluminum/titanium. The conductive layer having the multi-layer structure may include at least one metal layer and at least one transparent conductive layer.

At least one of the sensing insulation layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the sensing insulation layer 203 or the cover insulation layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Figure 7:
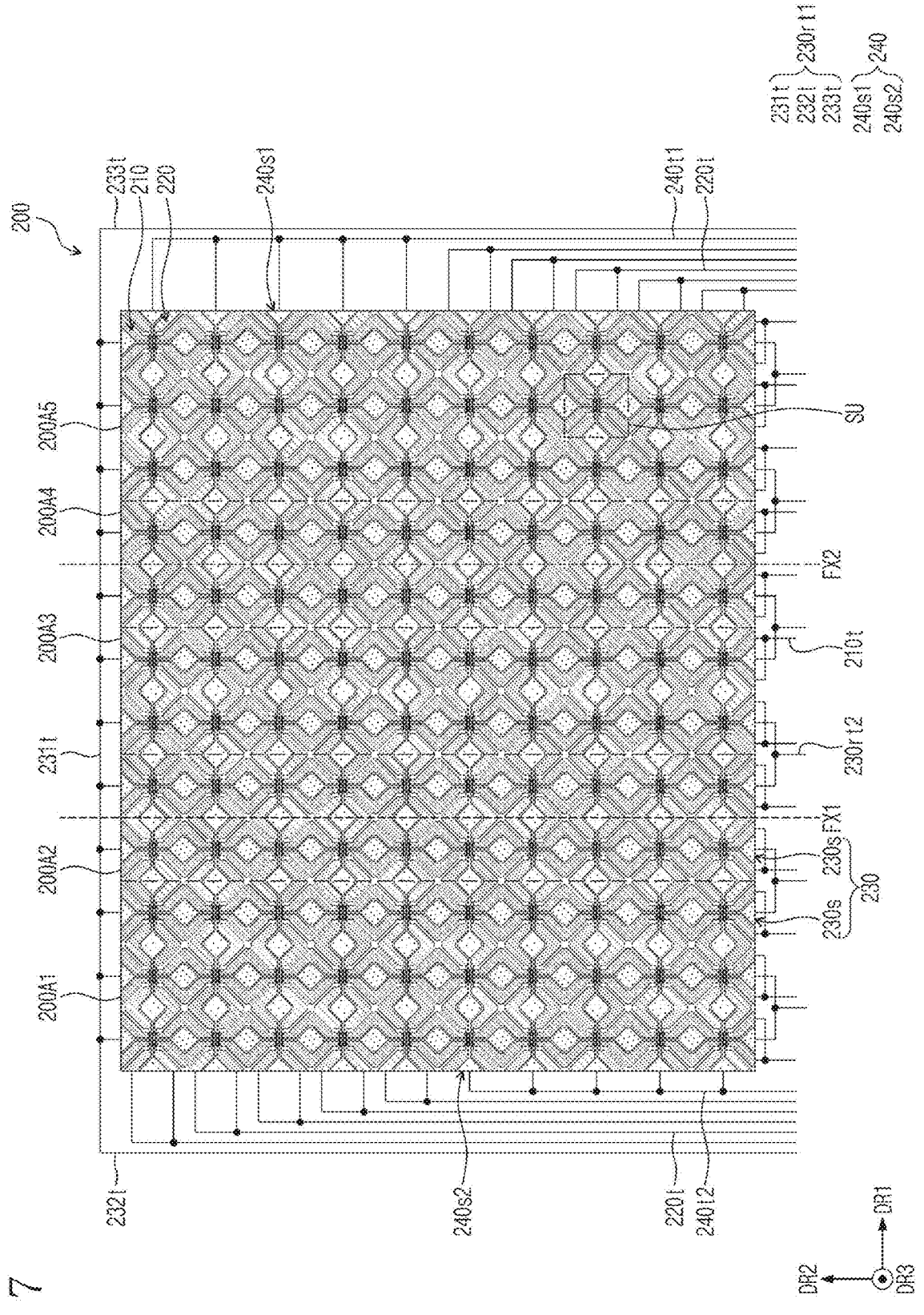
FIG. 7 is a plan view of a sensor layer according to some embodiments of the present disclosure.
Figure 9A:
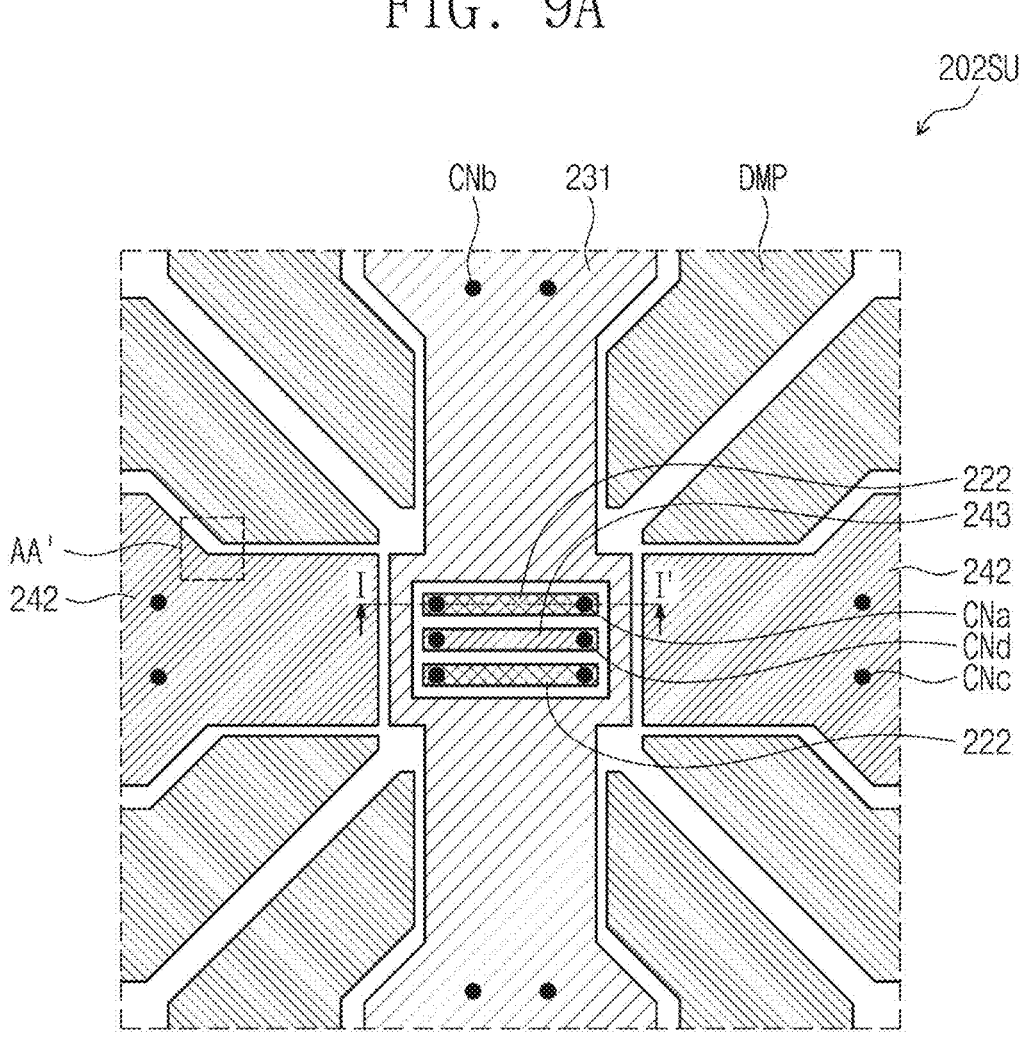
FIG. 9A is a plan view illustrating a first conductive layer of the sensing unit according to some embodiments of the present disclosure.
Figure 9A:
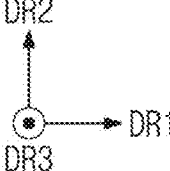
Figure 9B:
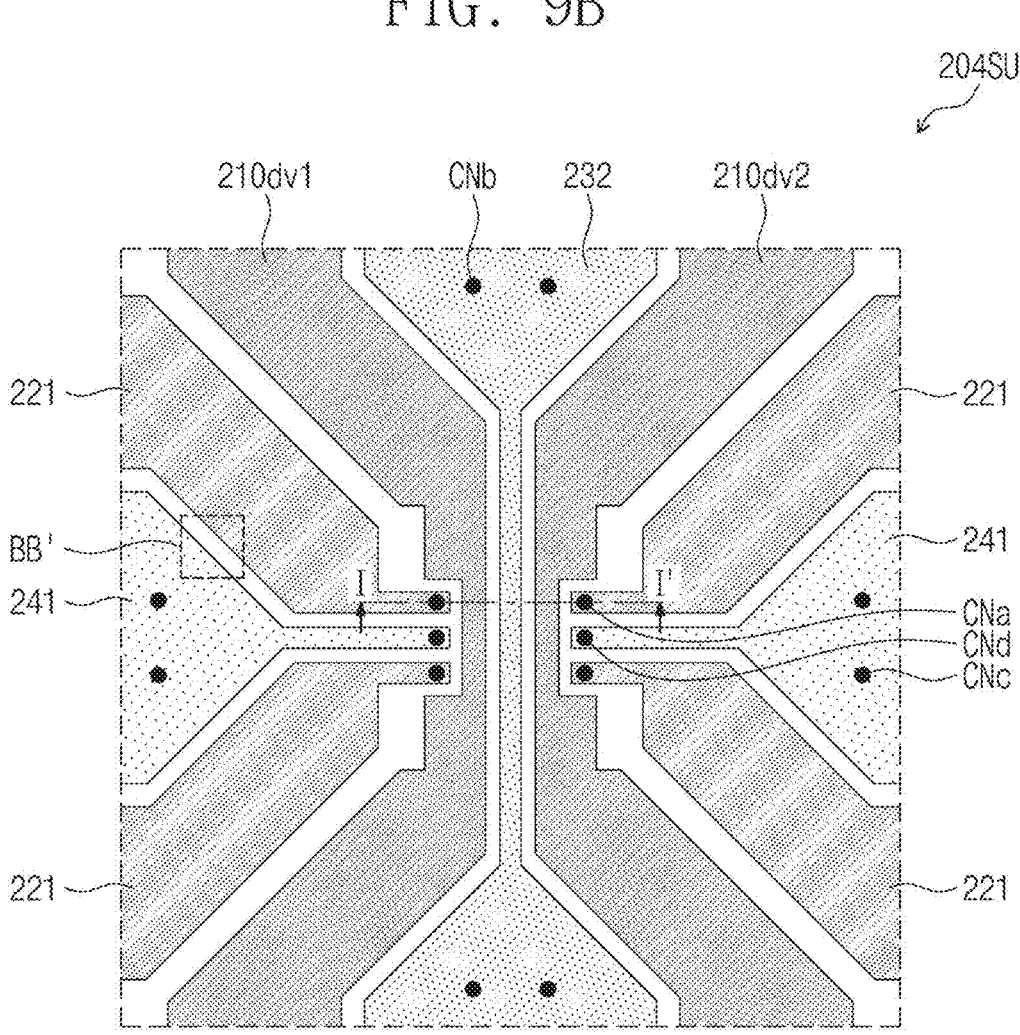
FIG. 9B is a plan view illustrating a second conductive layer of the sensing unit according to some embodiments of the present disclosure.
Figure 9B:
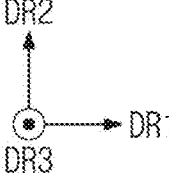
Figure 10:
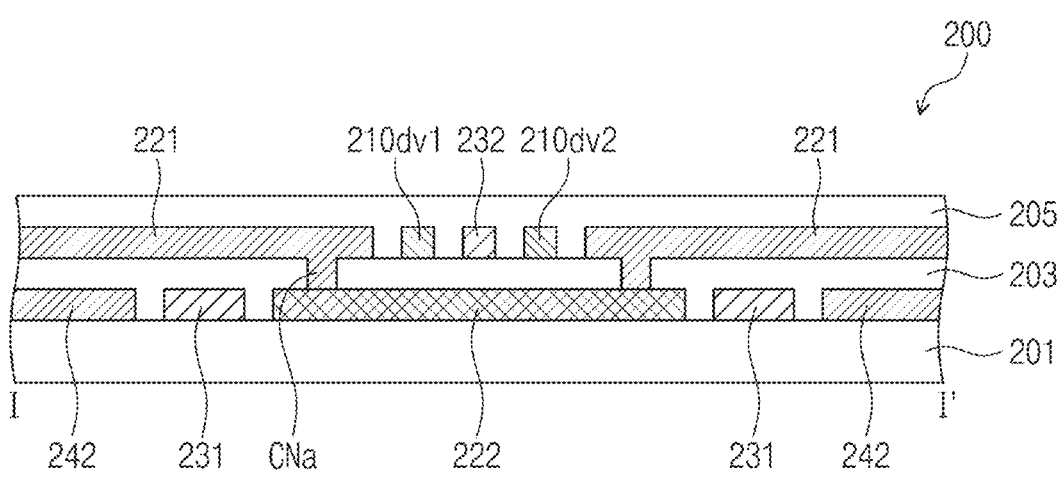
FIG. 10 is a sectional view of the sensor layer taken along the line I-I' illustrated in each of FIGS. 9A and 9B.
Figure 10:
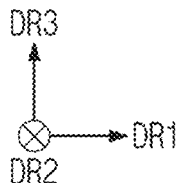

FIG. 7 is a plan view of the sensor layer according to some embodiments of the present disclosure. FIG. 8 is an enlarged plan view illustrating one sensing unit according to some embodiments of the present disclosure. FIG. 9A is a plan view illustrating a first conductive layer of the sensing unit according to some embodiments of the present disclosure. FIG. 9B is a plan view illustrating a second conductive layer of the sensing unit according to some embodiments of the present disclosure. FIG. 10 is a sectional view of the sensor layer taken along the line I-I' illustrated in each of FIGS. 9A and 9B.

Referring to FIG. 7, sensing regions 200A1, 200A2, 200A3, 200A4, and 200A5 may be defined in the sensor layer 200. The sensing regions 200A1, 200A2, 200A3, 200A4, and 200A5 may overlap the active region FS (refer to FIG. 1) when viewed from above the plane.

The sensing regions sensing regions 200A1, 200A2, 200A3, 200A4, and 200A5 may include the first sensing region 200A1, the second sensing region 200A2, the third sensing region 200A3, the fourth sensing region 200A4, and the fifth sensing region 200A5. The first sensing region 200A1, the second sensing region 200A2, the third sensing region 200A3, the fourth sensing region 200A4, and the fifth sensing region 200A5 may be arranged in the first direction DR1.

When viewed from above the plane, the first sensing region 200A1 may overlap the first non-folding region NFA1 (refer to FIG. 1), the second sensing region 200A2 may overlap the first folding region FA1 (refer to FIG. 1), the third sensing region 200A3 may overlap the second non-folding region NFA2 (refer to FIG. 1), the fourth sensing region 200A4 may overlap the second folding region FA2 (refer to FIG. 1), and the fifth sensing region 200A5 may overlap the third non-folding region NFA3 (refer to FIG. 1).

The sensor layer 200 may operate in a folded state or an unfolded state depending on an operation of the display layer 100 (refer to FIG. 1).

The electronic device 1000 may be folded about the first folding axis FX1 in an out-folding manner. Accordingly, the sensor layer 200 may be folded such that the first sensing region 200A1 and the third sensing region 200A3 face away from each other with respect to the first folding axis FX1 and the second sensing region 200A2 is convex toward the first folding axis FX1. Furthermore, the electronic device 1000 may be folded about the second folding axis FX2 in an in-folding manner. Accordingly, the sensor layer 200 may be folded such that the third sensing region 200A3 and the fifth sensing region 200A5 face each other and the fourth sensing region 200A4 surrounds the second folding axis FX2.

The sensor layer 200 may include a plurality of first electrodes 210, a plurality of second electrodes 220, a plurality of third electrodes 230, and a plurality of fourth electrodes 240 located in the sensing regions sensing regions 200A1, 200A2, 200A3, 200A4, and 200A5.

Each of the plurality of first electrodes 210 may be insulated from the plurality of second electrodes 220 and may cross the plurality of second electrodes 220. Each of the plurality of first electrodes 210 may extend in the second direction DR2. The plurality of first electrodes 210 may be arranged in the first direction DR1 so as to be spaced apart from each other. Each of the plurality of second electrodes 220 may extend in the first direction DR1. The plurality of second electrodes 220 may be arranged in the second direction DR2 so as to be spaced apart from each other. A sensing unit SU of the sensor layer 200 may be a region where one first electrode 210 and one second electrode 220 cross each other.

Referring to FIGS. 7 and 8, each of the plurality of first electrodes 210 may include first divided electrodes 210*dv*1 and 201*dv*2. Each of the first divided electrodes 210*dv*1 and 210*dv*2 may extend in the second direction DR2. The first divided electrodes 210*dv*1 and 210*dv*2 may be arranged in the first direction DR1 so as to be spaced apart from each other. The first divided electrodes 210*dv*1 and 210*dv*2 may have shapes having line symmetry with respect to a line extending in the second direction DR2.

Each of the plurality of second electrodes 220 may include second divided electrodes 220*dv*1 and 220*dv*2. Each of the second divided electrodes 220*dv*1 and 220*dv*2 may extend in the first direction DR1. The second divided electrodes 220*dv*1 and 220*dv*2 may be arranged in the second direction DR2 so as to be spaced apart from each other. The second divided electrodes 220*dv*1 and 220*dv*2 may have shapes having line symmetry with respect to a line extending in the first direction DR1.

Referring to FIGS. 8 to 10, each of the second divided electrodes 220*dv*1 and 220*dv*2 may include a sensing pattern 221 and a bridge pattern 222. The sensing pattern 221 and the bridge pattern 222 may be located in different layers. The sensing pattern 221 and the bridge pattern 222 may be electrically connected with each other through a first contact CNa. For example, the bridge pattern 222 may be included in the first conductive layer 202SU, and the sensing pattern 221 and the first divided electrodes 210*dv*1 and 210*dv*2 may be included in the second conductive layer 204SU.

The first conductive layer 202SU of the sensing unit SU may be included in the first conductive layer 202 (refer to FIG. 6) of the sensor layer 200, and the second conductive layer 204SU of the sensing unit SU may be included in the second conductive layer 204 (refer to FIG. 6) of the sensor layer 200.

Each of the plurality of third electrodes 230 may extend in the second direction DR2. The plurality of third electrodes 230 may be arranged in the first direction DR1 so as to be spaced apart from each other. According to some embodiments of the present disclosure, each of the plurality of third electrodes 230 may include a plurality of first auxiliary electrodes 230*s* connected in parallel. The number of first auxiliary electrodes 230*s* may be modified in various ways. For example, as the number of first auxiliary electrodes 230*s* included in each of the plurality of third electrodes 230 is increased, the resistances of the plurality of third electrodes 230 may be lowered, and thus power efficiency and sensing sensitivity may be relatively improved. In contrast, as the number of first auxiliary electrodes 230*s* included in each of the plurality of third electrodes 230 is decreased, a loop coil pattern formed using the plurality of third electrodes 230 may be implemented in more various forms.

Although FIG. 7 illustrates an example that one third electrode 230 includes two first auxiliary electrodes 230*s*, embodiments according to the present disclosure are not particularly limited thereto. The first auxiliary electrodes 230*s* may be arranged to correspond to the first electrodes 210 in a one-to-one manner. Accordingly, one sensing unit SU may include a portion of one first auxiliary electrode 230*s*.

A coupling capacitor may be defined between one first electrode 210 and one first auxiliary electrode 230*s*. In this case, an induced current generated when the pen is sensed may be transferred from the first auxiliary electrode 230*s* to the first electrode 210 through the coupling capacitor. That is, the first auxiliary electrode 230*s* may serve to supplement a signal transferred from the first electrode 210 to the sensor driver 200C. Accordingly, the greatest effect may be obtained when the phase of a signal induced in the first auxiliary electrode 230*s* coincides with the phase of a signal induced in the first electrode 210. Thus, the centers of the first electrodes 210 in the second direction DR2 may overlap the centers of the first auxiliary electrodes 230*s* in the second direction DR2. In addition, the centers of the first electrodes 210 in the first direction DR1 may overlap the centers of first auxiliary electrodes 230*s* in the first direction DR1.

According to some embodiments of the present disclosure, because one third electrode 230 includes two first auxiliary electrodes 230*s*, the one third electrode 230 may correspond to (or, overlap) two first electrodes 210. Accordingly, the number of first electrodes 210 included in the sensor layer 200 may be greater than the number of third electrodes 230. For example, the number of first electrodes 210 may be greater than the number of third electrodes 230 included in the sensor layer 200. For example, the number of first electrodes 210 may be equal to the product of the number of third electrodes 230 included in the sensor layer 200 and the number of first auxiliary electrodes 230*s* included in each of the third electrodes 230.

The fourth electrodes 240 may be arranged in the second direction DR2. The fourth electrodes 240 may extend in the first direction DR1. According to some embodiments of the present disclosure, each of the fourth electrodes 240 may include second auxiliary electrodes 240*s*1 or 240*s*2 connected in parallel. The second auxiliary electrodes 240*s*1 or 240*s*2 may be referred to as a second-first auxiliary electrode 240*s*1 or a second-second auxiliary electrode 240*s*2.

The routing directions of the second-first auxiliary electrode 240*s*1 and the second-second auxiliary electrode 240*s*2 may be different from each other. In this specification, different routing directions may mean that the connection positions of electrodes and trace lines are different from each other. For example, a first connection position of a fourth trace line 240*t*1 electrically connected with the second-first auxiliary electrode 240*s*1 may be different from a second connection position of a fourth trace line 240*t*2 electrically connected with the second-second auxiliary electrode 240*s*2. The first connection position may be a right end with respect to the second-first auxiliary electrode 240*s*1, and the second connection position may be a left end with respect to the second-second auxiliary electrode 240*s*2.

The ratio between the areas of two fourth electrodes 240 or the ratio between the numbers of second auxiliary electrodes included in the two fourth electrodes 240 may be 1:1. However, embodiments according to the present disclosure are not particularly limited thereto. For example, the number of second auxiliary electrodes 240*s*1 and the number of second auxiliary electrodes 240*s*2 may be different from each other.

According to some embodiments of the present disclosure, when each of the fourth electrodes 240 includes the second auxiliary electrodes 240*s*1 or 240*s*2 connected in parallel, an effect of increasing the area of one fourth electrode may be obtained. In addition, the resistances of the fourth electrodes 240 may be lowered, and thus the sensing sensitivity for the second input 3000 (refer to FIG. 7) may be relatively improved.

A coupling capacitor may be defined between one second electrode 220 and one second auxiliary electrode 240*s*1 or 240*s*2. In this case, an induced current generated when the pen is sensed may be transferred from the second auxiliary electrode 240*s*1 or 240*s*2 to the second electrode 220 through the coupling capacitor. That is, the second auxiliary electrode 240*s*1 or 240*s*2 may serve to supplement a signal transferred from the second electrode 220 to the sensor driver 200C (refer to FIG. 5). Accordingly, the greatest effect may be obtained when the phase of a signal induced in the second auxiliary electrode 240*s*1 or 240*s*2 coincides with the phase of a signal induced in the second electrode 220. Thus, the centers of the second electrodes 220 in the first direction DR1 may overlap the centers of the second auxiliary electrodes 240*s*1 or 240*s*2 in the first direction DR1. In addition, the centers of the second electrodes 220 in the second direction DR2 may overlap the centers of the second auxiliary electrodes 240*s*1 or 240*s*2 in the second direction DR2.

Referring to FIGS. 7, 9A, and 9B, each of the first auxiliary electrodes 230*s* included in the third electrode 230 may include a third-first pattern 231 and a third-second pattern 232. The third-first pattern 231 and the third-second pattern 232 may be located on different layers. The third-first pattern 231 and the third-second pattern 232 may be electrically connected with each other through a second contact CNb. The third-first pattern 231 may be included in the first conductive layer 202SU, and the third-second pattern 232 may be included in the second conductive layer 204SU.

According to some embodiments of the present disclosure, a portion of the third-first pattern 231 may overlap a portion of each of the first divided electrodes 210dv1 and 210dv2. Accordingly, coupling capacitance may be provided (or, formed) between the first electrode 210 and the third electrode 230.

Each of the second auxiliary electrodes 240s1 or 240s2 included in the fourth electrode 240 may include a fourth-first pattern 241, a fourth-second pattern 242, and a fourth-third pattern 243. The fourth-second pattern 242 and the fourth-third pattern 243 may be located on the same layer, and the fourth-first pattern 241 may be located on a layer different from the layer on which the fourth-second pattern 242 and the fourth-third pattern 243 are located. The fourth-first pattern 241 and the fourth-second pattern 242 may be electrically connected with each other through a third contact CNc, and the fourth-first pattern 241 and the fourth-third pattern 243 may be electrically connected with each other through a fourth contact CNd. The fourth-second pattern 242 and the fourth-third pattern 243 may be included in the first conductive layer 202SU, and the fourth-first pattern 241 may be included in the second conductive layer 204SU.

According to some embodiments of the present disclosure, a portion of the fourth-second pattern 242 may overlap the sensing pattern 221 of each of the second divided electrodes 220dv1 and 220dv2. Accordingly, a coupling capacitor may be defined (or, provided or formed) between the second electrode 220 and the fourth electrode 240.

According to some embodiments of the present disclosure, the first conductive layer 202SU may further include dummy patterns DMP. Each of the dummy patterns DMP may be electrically floated or electrically grounded. According to some embodiments of the present disclosure, the dummy patterns DMP may be omitted.

The sensor layer 200 may further include a plurality of first trace lines 210t and a plurality of second trace lines 220t.

The first trace lines 210t may be electrically connected to the first electrodes 210 in a one-to-one correspondence. Two first divided electrodes 210dv1 and 210dv2 included in one first electrode 210 may be connected to one first trace line among the first trace lines 210t. Each of the first trace lines 210t may include a plurality of branch portions for connection to two first divided electrodes 210dv1 and 210dv2.

The second trace lines 220t may be electrically connected to the second electrodes 220 in a one-to-one correspondence. Two second divided electrodes 220dv1 and 220dv2 included in one second electrode 220 may be connected to one second trace line among the second trace lines 220t. Each of the second trace lines 220t may include a plurality of branch portions for connection to two second divided electrodes 220dv1 and 220dv2.

The sensor layer 200 may further include a third trace line 230rt1, the plurality of fourth trace lines 240t1 and 240t2, and fifth trace lines 230rt2.

The third trace line 230rt1 may be electrically connected with at least one first auxiliary electrode 230s among the first auxiliary electrodes 230s. According to some embodiments of the present disclosure, the third trace line 230rt1 may be electrically connected with all of the first auxiliary electrodes 230s. That is, the third trace line 230rt1 may be electrically connected to all of the third electrodes 230. The third trace line 230rt1 may include a first line segment 231t that extends in the first direction DR1 and that is electrically connected to the third electrodes 230, a second line segment 232t extending from a first end of the first line segment 231t in the second direction DR2, and a third line segment 233t extending from a second end of the first line segment 231t in the second direction DR2.

According to some embodiments of the present disclosure, each of the resistance of the second line segment 232t and the resistance of the third line segment 233t may be substantially the same as the resistance of one third electrode among the third electrodes 230. Accordingly, the second line segment 232t and the third line segment 233t may serve as the third electrodes 230, and the same effect as arranging the third electrodes 230 even in the peripheral region 200NA may be obtained. For example, one of the second line segment 232t and the third line segment 233t and one of the third electrodes 230 may form a coil. Accordingly, the pen located in a region adjacent to the peripheral region 200NA may also be sufficiently charged by a loop including the second line segment 232t or the third line segment 233t.

According to some embodiments of the present disclosure, to adjust the resistance of the second line segment 232t and the resistance of the third line segment 233t, the widths of the second line segment 232t and the third line segment 233t in the first direction DR1 may be adjusted. However, this is merely illustrative, and the first to third line segments 231t, 232t, and 233t may have substantially the same width.

The fifth trace lines 230rt2 may be connected to the third electrodes 230 in a one-to-one correspondence. That is, the number of fifth trace lines 230rt2 may correspond to the number of third electrodes 230.

The fourth trace lines 240t1 and 240t2 may be spaced apart from each other in the first direction DR1. The fourth trace line 240t1 may be electrically connected to at least one second auxiliary electrode 240s1 among the second auxiliary electrodes 240s1. For example, one end of each of the second auxiliary electrodes 240s1 may be connected to the fourth trace line 240t1. The fourth trace line 240t2 may be electrically connected to at least one second auxiliary electrode 240s2 among the second auxiliary electrodes 240s2. For example, one end of each of the second auxiliary electrodes 240s2 may be connected to the fourth trace line 240t2.

Figure 11A:
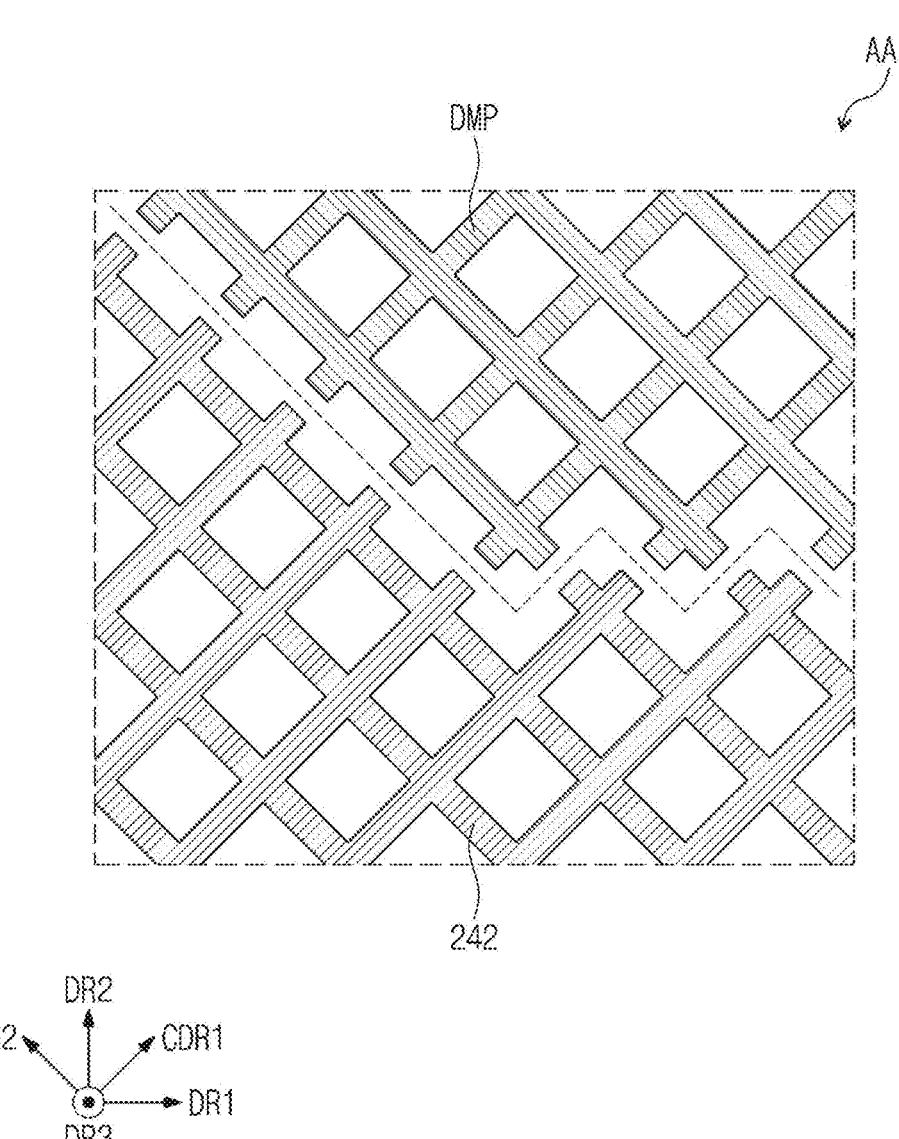
FIG. 11A is an enlarged plan view illustrating further details of the region AA' in FIG. 9A according to some embodiments of the present disclosure.
Figure 11B:
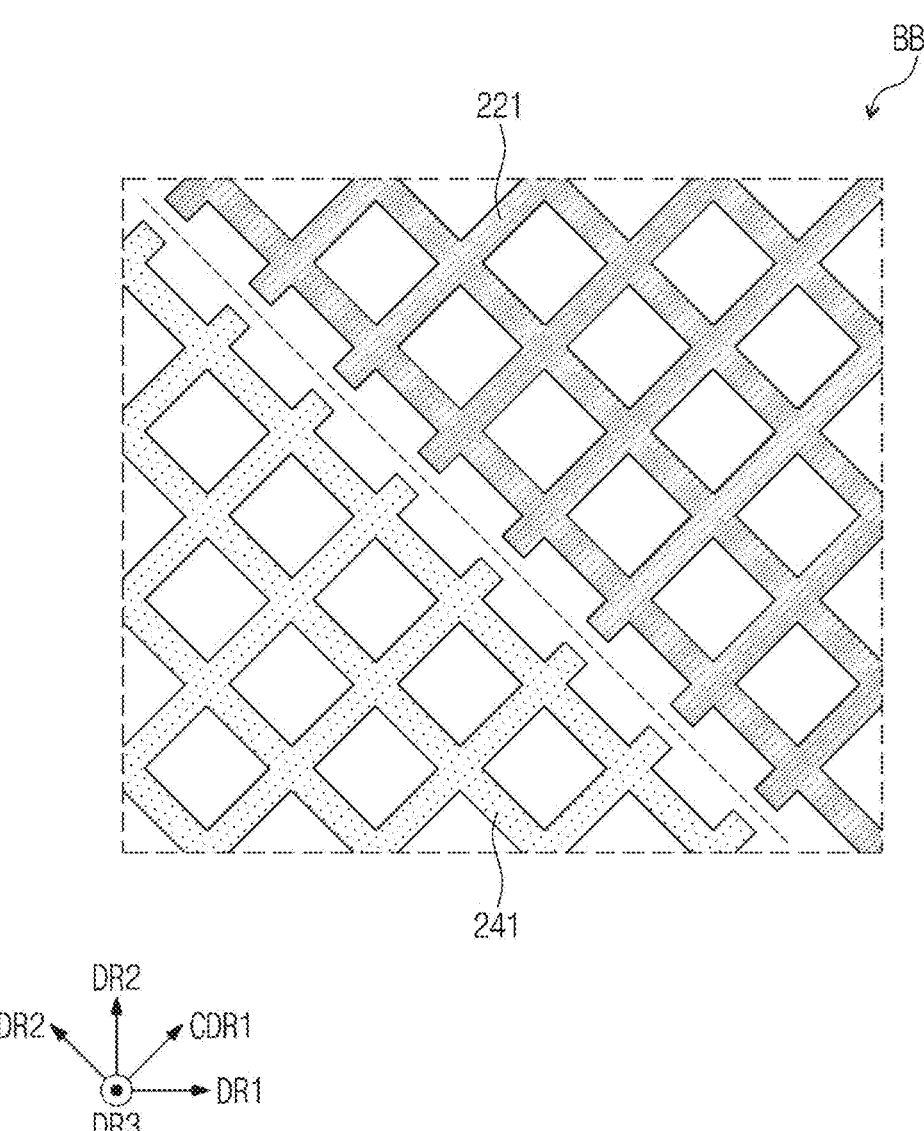
FIG. 11B is an enlarged plan view illustrating region BB' in FIG. 9B according to some embodiments of the present disclosure.

FIG. 11A is an enlarged plan view illustrating further details of the region AA' in FIG. 9A according to some embodiments of the present disclosure, and FIG. 11B is an enlarged plan view illustrating region BB' in FIG. 9B according to some embodiments of the present disclosure.

Referring to FIGS. 9A, 9B, 11A, and 11B, each of the first electrodes 210, the second electrodes 220, the third electrodes 230, the fourth electrodes 240, and the dummy patterns DMP may have a mesh structure. The mesh structure may include a plurality of mesh lines. The plurality of mesh lines may have straight-line shapes extending in certain directions and may be connected with one another. Openings where the mesh structure is not located may be defined (or, provided or formed) in each of the first electrodes 210, the second electrodes 220, the third electrodes 230, the fourth electrodes 240, and the dummy patterns DMP.

FIGS. 11A and 11B illustrate an example that the mesh structure includes mesh lines extending in a first crossing direction CDR1 that crosses the first direction DR1 and the second direction DR2 and mesh lines extending in a second crossing direction CDR2 that crosses the first crossing direction CDR1. However, the extension directions of the mesh lines constituting the mesh structure are not particularly limited to those illustrated in FIGS. 11A and 11B. For example, the mesh structure may include only mesh lines extending in the first direction DR1 and the second direction DR2, or may include mesh lines extending in the first direction DR1, the second direction DR2, the first crossing direction CDR1, and the second crossing direction CDR2. That is, the mesh structure may be modified in various forms.

Figure 12:
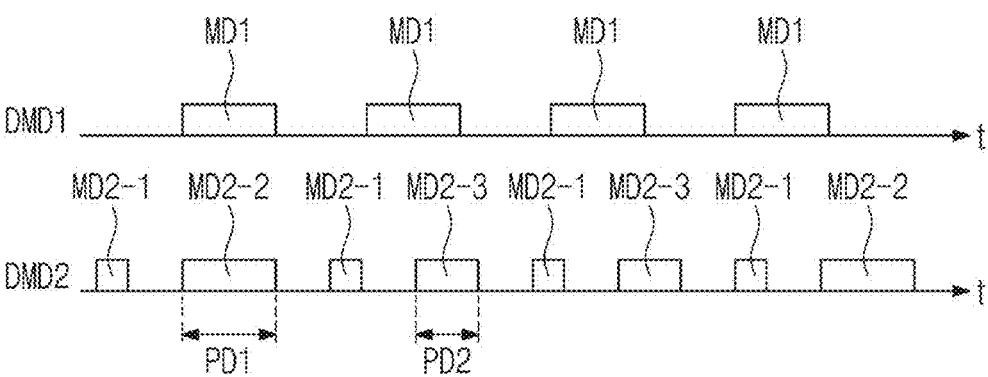
FIG. 12 is a view illustrating an operation of a sensor driver according to some embodiments of the present disclosure.

FIG. 12 is a view illustrating an operation of the sensor driver according to some embodiments of the present disclosure.

Referring to FIGS. 5, 7, and 12, the sensor driver 200C may be configured to selectively operate in one of the first mode DMD1 and the second mode DMD2. The first mode DMD1 may be a mode for sensing a touch. The second mode DMD2 may be a mode for sensing the pen PN. That is, the electronic device 1000 may sense the first input 2000 in the first mode DMD1 and may sense the second input 3000 in the second mode DMD2.

The sensor driver 200C may switch to the first mode DMD1 or the second mode DMD2 depending on a situation.

In FIG. 12, operations in the first mode DMD1 and the second mode DMD2 are illustrated in order of time (t).

In the first mode DMD1, the sensor driver 200C may operate in a touch mode MD1.

During the touch mode MD1, the sensor layer 200 may be scan-driven to detect the coordinates by the first input 2000. During the touch mode MD1, the third electrodes 230 and the fourth electrodes 240 may all be grounded. Accordingly, touch noise may be prevented from being introduced through the third electrodes 230 and the fourth electrodes 240.

In the second mode DMD2, the sensor driver 200C may operate in a first sub-mode MD2-1, a second sub-mode MD2-2, and a third sub-mode MD2-3.

In the first sub-mode MD2-1, a folded state or an unfolded state of the sensor layer 200 may be identified. The second sub-mode MD2-2 may operate when the sensor layer 200 is in the unfolded state. The third sub-mode MD2-3 may operate when the sensor layer 200 is in the folded state. The first sub-mode MD2-1 may be periodically driven. That is, the first sub-mode MD2-1 may be driven at a certain frequency to determine whether the sensor layer 200 is folded or not. For example, the frequency may be 15 Hz or 30 Hz. However, this is illustrative, and the operating frequency of the first sub-mode MD2-1 is not limited thereto and may be provided in various ways.

The operating time PD1 of the second sub-mode MD2-2 may be longer than the operating time PD2 of the third sub-mode MD2-3. Because the operating time of a charging drive mode of the second sub-mode MD2-2 is longer than the operating time of a charging drive mode of the third sub-mode MD2-3, the operating times PD1 and PD2 may be different from each other. Description thereabout will be given below.

During the second sub-mode MD2-2 and the third sub-mode MD2-3, the sensor layer 200 may be scan-driven to detect the coordinates by the second input 3000. In the second sub-mode MD2-2 and the third sub-mode MD2-3, first ends of the third electrodes 230 and the fourth electrodes 240 may all be floated. In addition, second ends of the third electrodes 230 and the fourth electrodes 240 may all be grounded or floated. Accordingly, compensation of a sensing signal may be maximized by the coupling between the first electrodes 210 and the third electrodes 230 and the coupling between the second electrodes 220 and the fourth electrodes 240.

During the second mode DMD2, the sensor layer 200 may be scan-driven to detect the coordinates by the second input 3000. In the second mode DMD2, the first ends of the third electrodes 230 and the fourth electrodes 240 may all be floated. In addition, in the second mode DMD2, the second ends of the third electrodes 230 and the fourth electrodes 240 may all be grounded or floated. Accordingly, compensation of a sensing signal may be maximized by the coupling between the first electrodes 210 and the third electrodes 230 and the coupling between the second electrodes 220 and the fourth electrodes 240.

Although FIG. 12 illustrates an example that the first mode DMD1 and the second mode DMD2 are separately driven, an operation of the sensor driver 200C is not limited thereto. For example, the touch mode MD1, the first sub-mode MD2-1, the second sub-mode MD2-2, and the third sub-mode MD2-3 may be intermingled.

Figure 13:
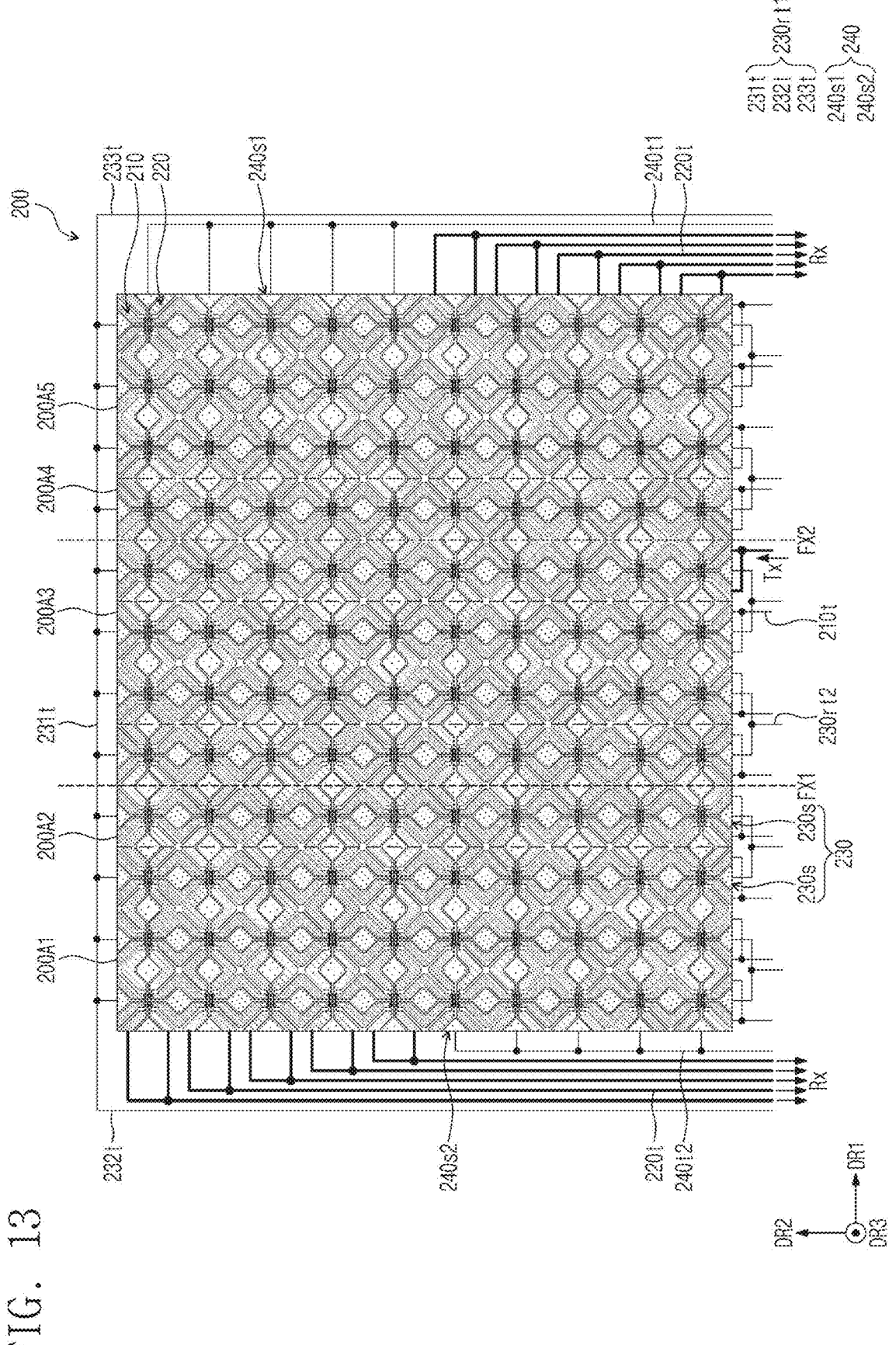
FIG. 13 is a view for explaining a touch mode according to some embodiments of the present disclosure.

FIG. 13 is a view for explaining the touch mode according to some embodiments of the present disclosure. In describing FIG. 13, the components described with reference to FIG. 7 will be assigned with the same reference numerals, and some repeated descriptions thereof may be omitted.

Referring to FIGS. 5, 12, and 13, the touch mode MD1 may include a mutual capacitance detection mode.

In the mutual capacitance detection mode, the sensor driver 200C may sequentially provide a transmission signal Tx to the first electrodes 210 and may detect the coordinates for the first input 2000 using a reception signal Rx detected through the second electrodes 220. For example, the sensor driver 200C may sense a change in mutual capacitance between the first electrodes 210 and the second electrodes 220 and may calculate the coordinates for the first input 2000.

In the mutual capacitance detection mode, the third electrodes 230 and the fourth electrodes 240 may all be grounded. Accordingly, noise may not be introduced through the third electrodes 230 and the fourth electrodes 240.

Although FIG. 13 illustrates an example that the touch mode MD1 operates as the mutual capacitance detection mode, an operation of the touch mode MD1 is not limited thereto. For example, the touch mode MD1 may further include a self-capacitance detection mode.

Figure 14:
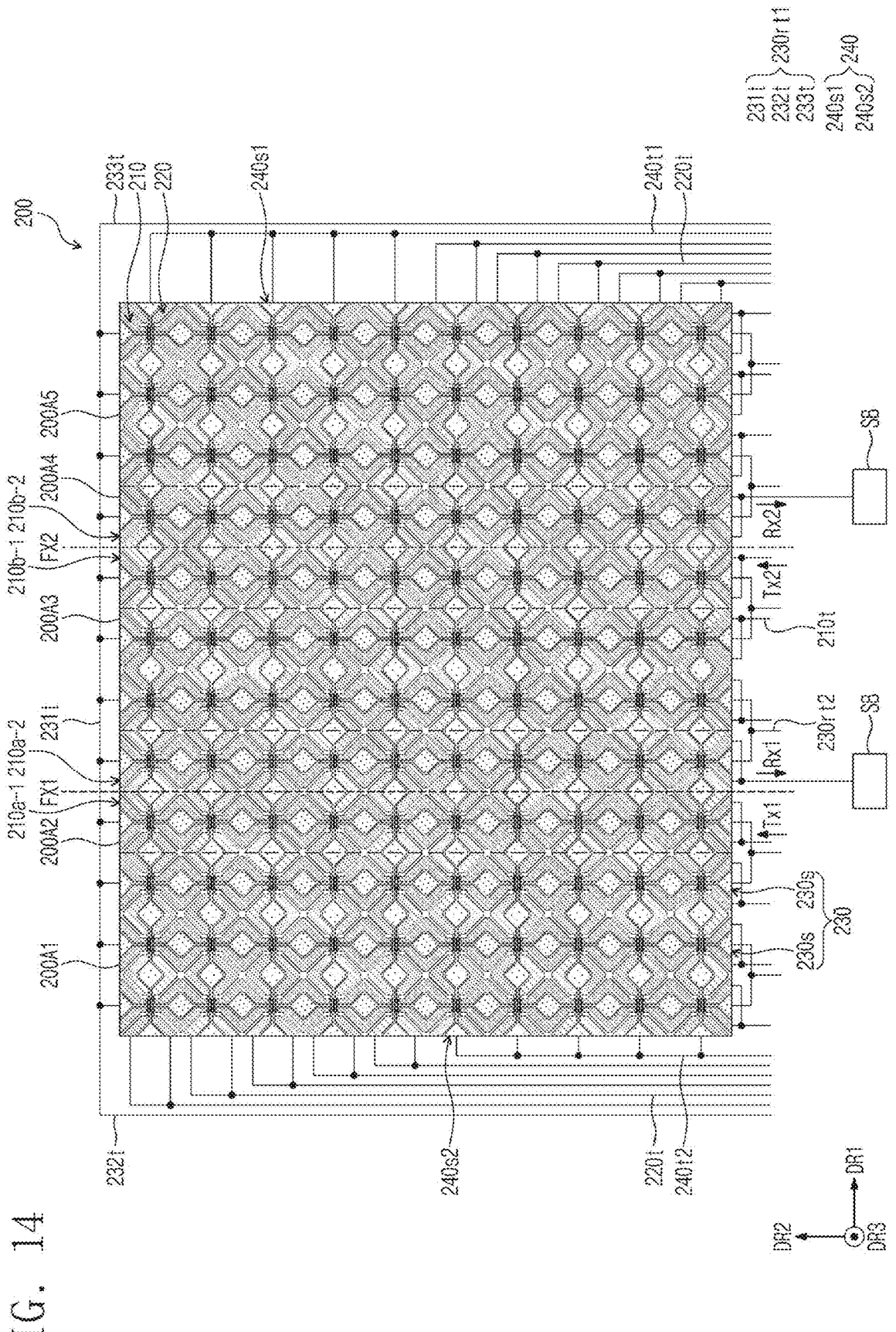
FIG. 14 is a view for explaining a first sub-mode according to some embodiments of the present disclosure.
Figure 15:
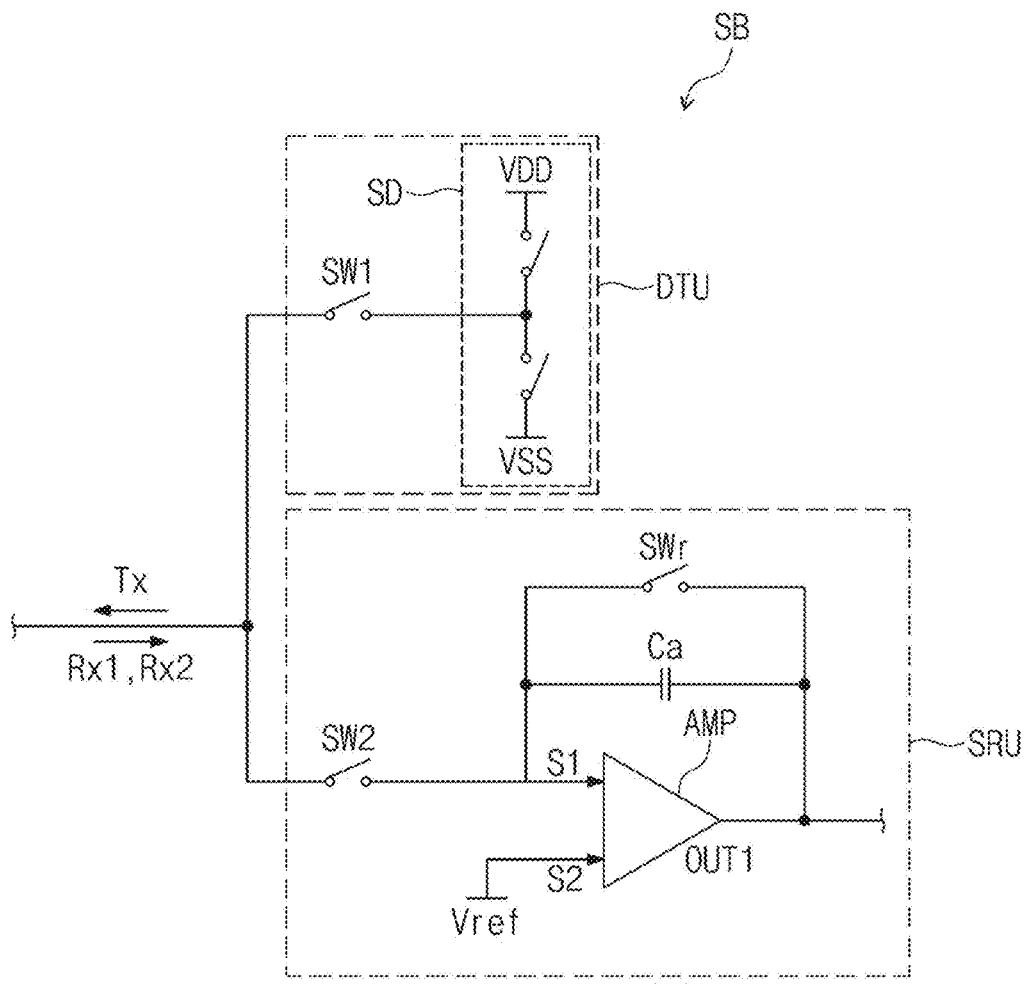
FIG. 15 is a circuit diagram illustrating a folding recognition unit according to some embodiments of the present disclosure.

FIG. 14 is a view for explaining the first sub-mode according to some embodiments of the present disclosure, and FIG. 15 is a circuit diagram illustrating a folding recognition unit according to some embodiments of the present disclosure. In describing FIG. 14, the components described with reference to FIG. 7 will be assigned with the same reference numerals, and some repeated descriptions thereof may be omitted.

Referring to FIGS. 5, 12, 14, and 15, the sensor driver 200C may include the folding recognition unit SB. A plurality of folding recognition units SB may be provided. For example, as many folding recognition units SB as folding axes defined in the electronic device 1000 may be provided. Because the first folding axis FX1 and the second folding axis FX2 are defined in the electronic device 1000, two folding recognition units SB are illustrated in FIG. 14.

Each of the plurality of folding recognition units SB may be electrically connected with at least one first electrode 210 adjacent to the folding axis FX1 or FX2 in the first direction DR1 among the plurality of first electrodes 210.

One first electrode 210a-1 adjacent to the first folding axis FX1 and one first electrode 210b-1 adjacent to the second folding axis FX2 may be electrically connected with the folding recognition units SB through the first trace lines 210t, respectively.

In the first sub-mode MD2-1, the sensor driver 200C may transmit a transmission signal Tx to a first electrode 210a-2 adjacent to the first electrode 210a-1 and a first electrode 210b-2 adjacent to the first electrode 210b-1.

Each of the folding recognition units SB may include a driving unit DTU that generates the transmission signal Tx and a sensing unit SRU that receives reception signals Rx1 and Rx2.

The driving unit DTU may include a first switch SW1 and a signal generator SD. The first switch SW1 may determine whether to connect the first trace line 210t and the driving unit DTU. The signal generator SD may generate the transmission signal Tx. The transmission signal Tx may have a first drive voltage VDD at a high level and may have a second drive voltage VSS at a low level. The signal generator SD may be implemented in the form of a complementary metal-oxide-semiconductor (CMOS).

The sensing unit SRU may include a second switch SW2, an amplifier AMP, a capacitor Ca, and a switch SWr. The second switch SW2 may determine whether to connect the first trace line 210t and the sensing unit SRU.

The amplifier AMP may be implemented as an analog front end (AFE). The amplifier AMP may include an operational amplifier (OP Amp). The amplifier AMP may include a first input terminal S1 and a second input terminal S2. The first input terminal S1 may be electrically connected with the second switch SW2.

A reference voltage Vref may be provided to the second input terminal S2 of the amplifier AMP. The capacitor Ca and the switch SWr may be connected in parallel between the first input terminal S1 and an output terminal OUT1.

A signal corresponding to a difference in voltage between the first input terminal S1 and the second input terminal S2 may be output to the output terminal OUT1. The sensor driver 200C may sense a change in mutual capacitance between the first electrodes 210a-1 and 210a-2 or 210b-1 and 210b-2, based on the signal.

In the first sub-mode MD2-1, the folding recognition unit SB may operate as the sensing unit SRU. That is, in the first sub-mode MD2-1, the first switch SW1 may be deactivated, and the second switch SW2 may be activated. The first trace lines 210t connected with the first electrodes 210a-1 and 210b-1 may be connected with the sensing unit SRU and may not be connected with the driving unit DTU.

In the first mode MD1, the second sub-mode MD2-2, and the third sub-mode MD2-3, the folding recognition unit SB may operate as the driving unit DTU. That is, in the first mode MD1, the second sub-mode MD2-2, and the third sub-mode MD2-3, the first switch SW1 may be activated, and the second switch SW2 may be deactivated. The first trace lines 210t connected with the first electrodes 210a-1 and 210b-1 may be connected with the driving unit DTU and may not be connected with the sensing unit SRU.

The transmission signal Tx may include a first transmission signal Tx1 and a second transmission signal Tx2. The first transmission signal Tx1 may be a signal provided to the first electrode 210a-2, and the second transmission signal Tx2 may be a signal provided to the first electrode 210b-2.

In the first sub-mode MD2-1, the sensor driver 200C may recognize a folded state of the sensor layer 200, based on the reception signals Rx1 and Rx2 received from the first electrodes 210a-1 and 210b-1 through the folding recognition units SB.

When the second sensing region 200A2 of the sensor layer 200 is in an unfolded state, the first electrode 210a-1 to which the first transmission signal Tx1 is provided and the first electrode 210a-2 that outputs the reception signal Rx1 may be spaced apart from each other in the first direction DR1.

The sensing unit SRU may sense a first mutual capacitance value between the first electrodes 210a-1 and 210a-2, based on the reception signal Rx1.

When the second sensing region 200A2 of the sensor layer 200 is folded about the first folding axis FX1, the first electrode 210a-1 to which the first transmission signal Tx1 is provided and the first electrode 210a-2 that outputs the reception signal Rx1 may be spaced apart from each other in the third direction DR3. That is, the first electrodes 210a-1 and 210a-2 may face each other.

The sensing unit SRU may sense a second mutual capacitance value between the first electrodes 210a-1 and 210a-2, based on the reception signal Rx1. The first mutual capacitance value may be different from the second mutual capacitance value.

The second mutual capacitance value may be greater than the first mutual capacitance value. Based on the first mutual capacitance value or the second mutual capacitance value measured by the sensing unit SRU, the sensor driver 200C may determine whether the sensor layer 200 is in a folded state or an unfolded state. For example, when the mutual capacitance value measured by the sensing unit SRU exceeds a certain threshold value, the sensor driver 200C may determine that the sensor layer 200 is in a folded state, and when the mutual capacitance value measured by the sensing unit SRU is less than or equal to the certain threshold value, the sensor driver 200C may determine that the sensor layer 200 is in an unfolded state.

When the fourth sensing region 200A4 of the sensor layer 200 is in an unfolded state, the first electrode 210b-1 to which the second transmission signal Tx2 is provided and the first electrode 210b-2 that outputs the reception signal Rx2 may be spaced apart from each other in the first direction DR1.

The sensing unit SRU may sense a third mutual capacitance value between the first electrodes 210b-1 and 210b-2, based on the reception signal Rx2.

When the fourth sensing region 200A4 of the sensor layer 200 is folded about the second folding axis FX2, the first electrode 210b-1 to which the second transmission signal Tx2 is provided and the first electrode 210b-2 that outputs the reception signal Rx2 may be spaced apart from each other in the third direction DR3. That is, the first electrodes 210b-1 and 210b-2 may face each other.

The sensing unit SRU may sense a fourth mutual capacitance value between the first electrodes 210b-1 and 210b-2, based on the reception signal Rx2. The third mutual capacitance value may be different from the fourth mutual capacitance value.

The fourth mutual capacitance value may be greater than the third mutual capacitance value. Based on the third mutual capacitance value or the fourth mutual capacitance value measured by the sensing unit SRU, the sensor driver 200C may determine whether the sensor layer 200 is in a folded state or an unfolded state.

Although FIG. 14 illustrates an example that the transmission signal Tx is provided from one first electrode 210a-1 or 210b-1 and one folding recognition unit SB is electrically connected with one first electrode 210a-2 or 210b-2 and receives the reception signal Rx1 or Rx2, the configuration of the folding recognition unit SB is not limited thereto. For example, one folding recognition unit SB may be electrically connected with two or more first electrodes and may receive reception signals from the two or more first electrodes, respectively, to determine whether the sensor layer 200 is folded. In this case, the sensing sensitivity may be relatively improved.

Figure 16:
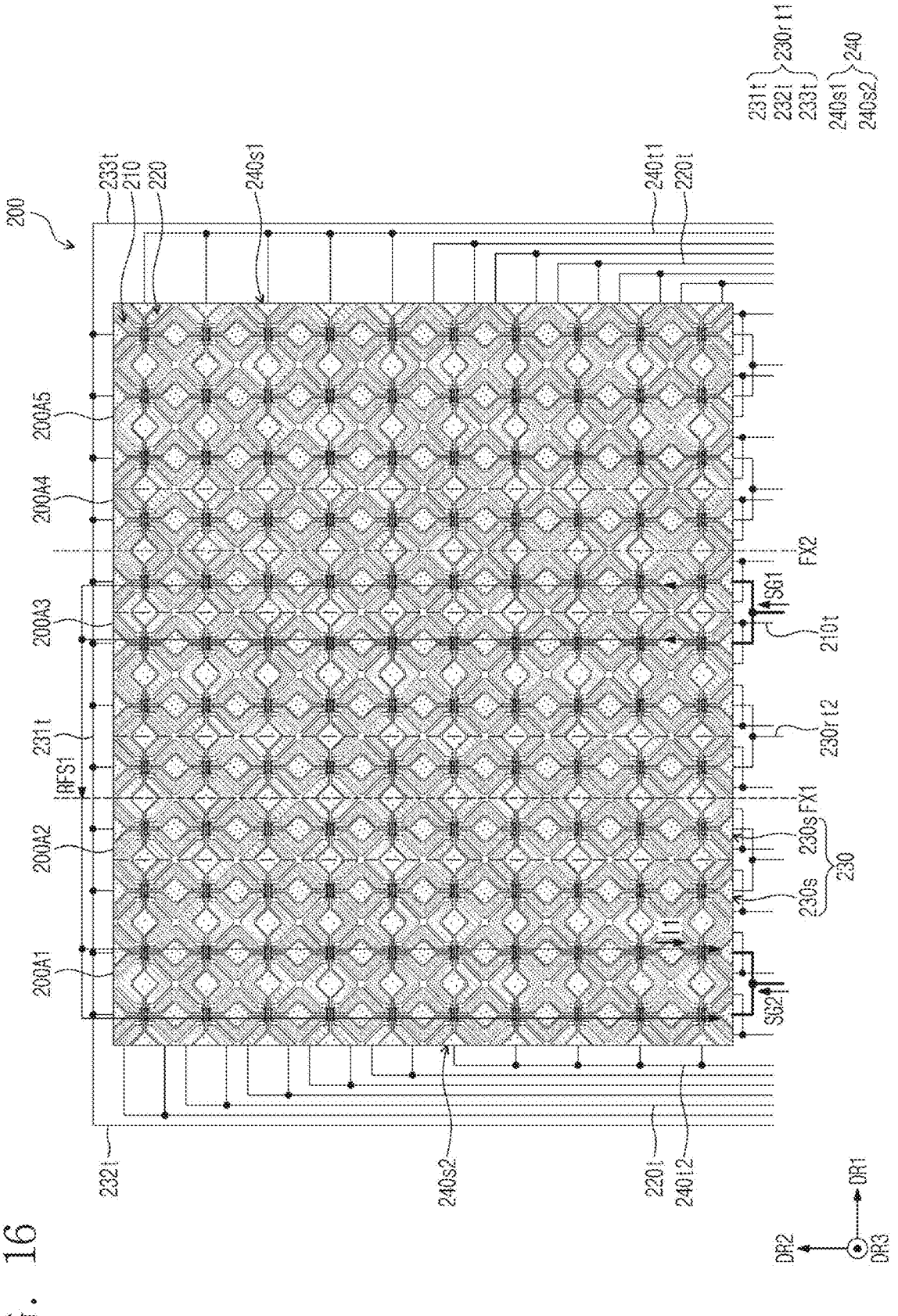
FIG. 16 is a view for explaining a charging drive mode of a second sub-mode according to some embodiments of the present disclosure.
Figure 17A:
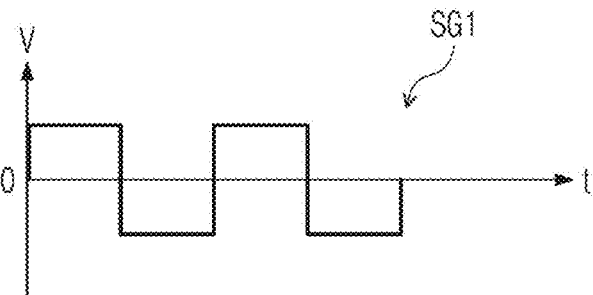
FIG. 17A is a graph depicting the waveform of a first charging signal according to some embodiments of the present disclosure.
Figure 17B:
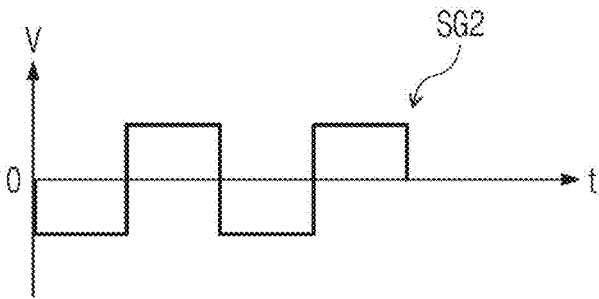
FIG. 17B is a graph depicting the waveform of a second charging signal according to some embodiments of the present disclosure.

FIG. 16 is a view for explaining a charging drive mode of the second sub-mode according to some embodiments of the present disclosure. FIG. 17A is a graph depicting the waveform of a first charging signal according to some embodiments of the present disclosure, and FIG. 17B is a graph depicting the waveform of a second charging signal according to some embodiments of the present disclosure. In describing FIG. 16, the components described with reference to FIG. 7 will be assigned with the same reference numerals, and some repeated descriptions thereof may be omitted.

Referring to FIGS. 5, 12, and 16 to 17B, each of the second sub-mode MD2-2 and the third sub-mode MD2-3 may include a charging drive mode and a pen sensing drive mode. The second sub-mode MD2-2 may operate when it is determined in the first sub-mode MD2-1 that the sensor layer 200 is in an unfolded state.

When the sensor layer 200 is in the unfolded state, the display layer 100 may have the first display region DA1 (refer to FIG. 1), and the regions where the sensor layer 200 is exposed to the outside may be the first to fifth sensing regions 200A1 to 200A5.

In the charging drive mode of the second sub-mode MD2-2, the sensor driver 200C may apply the first charging signal SG1 to at least one of the fifth trace lines 230rt2 and may apply the second charging signal SG2 to at least one other fifth trace line 230rt2.

The second charging signal SG2 may be an inverse signal of the first charging signal SG1. For example, the first charging signal SG1 and the second charging signal SG2 may be square waves. However, this is illustrative, and the waveforms of the first charging signal SG1 and the second charging signal SG2 according to some embodiments of the present disclosure are not limited thereto. For example, the first charging signal SG1 and the second charging signal SG2 may be sinusoidal waves.

According to the present disclosure, the first charging signal SG1 and the second charging signal SG2 may have an inverse phase relationship. Accordingly, noise caused in the display layer 100 by the first charging signal SG1 may cancel out noise caused by the second charging signal SG2. Thus, a flicker phenomenon occurring in the display layer 100 may be prevented or eliminated. The display quality of the display layer 100 may be relatively improved.

Although FIG. 16 illustrates an example that the first charging signal SG1 is applied to one fifth trace line 230rt2 and the second charging signal SG2 is applied to another fifth trace line 230rt2, embodiments according to the present disclosure are not limited thereto. For example, the first charging signal SG1 may be applied to two or more fifth trace lines 230rt2, and the second charging signal SG2 may be applied to other two or more fifth trace lines 230rt2.

Because the first charging signal SG1 and the second charging signal SG2 are applied to the plurality of first auxiliary electrodes 230s through the third trace line 230rt1 and/or at least two fifth trace lines 230rt2, a current I may have a current path RFS1 along which the current I flows through at least one fifth trace line 230rt2, the plurality of first auxiliary electrodes 230s, the first line segment 231t, the plurality of first auxiliary electrodes 230s, and at least one other fifth trace line 230rt2. Furthermore, because the first charging signal SG1 and the second charging signal SG2 are square-wave signals having an inverse phase relationship, the direction of the current I may be periodically varied. The current path RFS1 may have a coil shape. In the charging drive mode of the second sub-mode MD2-2, the resonance circuit of the pen PN may be charged by the current path RFS1.

According to the present disclosure, the current path RFS1 of a loop coil pattern may be implemented by the components included in the sensor layer 200. The electronic device 1000 may charge the pen PN using the sensor layer 200. Because a component having a coil for charging the pen PN does not need to be separately added, an increase in the thickness and weight of the electronic device 1000 and a decrease in the flexibility of the electronic device 1000 may not occur. Accordingly, the electronic device 1000 with relatively improved reliability may be provided.

In the charging drive mode, the first electrodes 210, the second electrodes 220, and the fourth electrodes 240 may be grounded or electrically floated, or may have a constant voltage applied thereto. In particular, the first electrodes 210, the second electrodes 220, and the fourth electrodes 240 may be floated. In this case, the current I may not flow to the first electrodes 210, the second electrodes 220, and the fourth electrodes 240.

FIG. 18 is a table showing signals provided to the sensor layer according to some embodiments of the present disclosure.

Referring to FIGS. 5, 16, and 18, between at least one first auxiliary electrode 230s to which the first charging signal SG1 is provided and at least one other first auxiliary electrode 230s to which the second charging signal SG2 is provided, at least one of the remaining first auxiliary electrodes 230s may be located. That is, at least one first auxiliary electrode 230s to which the first charging signal SG1 is provided and at least one other first auxiliary electrode 230s to which the second charging signal SG2 is provided may be spaced apart from each other with at least one of the remaining first auxiliary electrodes 230s therebetween.

The sensor driver 200C may sequentially provide the charging signals SG1 and SG2 to the plurality of first auxiliary electrodes 230s in the first direction DR1 during the charging drive mode.

The table of FIG. 18 shows signals provided to the second line segment 232t, first to seventh charging channels 230ch1, 230ch2, 230ch3, 230ch4, 230ch5, 230ch6, and 230ch7 (hereinafter, 230ch1 to 230ch7), and the third line segment 233t or states thereof in first to n-th sections t1 to tn. The first to seventh charging channels 230ch1 to 230ch7 may correspond to the third electrodes 230, respectively.

The signals listed in the table of FIG. 18 are signals provided to the sensor layer 200 in the charging drive mode of the second sub-mode MD2-2. In the charging drive mode of the second sub-mode MD2-2, the first charging signal SG1 or the second charging signal SG2 may be provided to all the channels included in the sensor layer 200. That is, in the charging drive mode of the second sub-mode MD2-2, the entire sensing regions 200A1 to 200A5 of the sensor layer 200 may be scanned.

In the first section t1, the second charging signal SG2 may be provided to the second line segment 232t and the first charging channel 230ch1, and the first charging signal SG1 may be provided to the fourth charging channel 230ch4 and the fifth charging channel 230ch5. The third line segment 233t and the remaining charging channels 230ch2, 230ch3, 230ch6, and 230ch7 to which the first charging signal SG1 and the second charging signal SG2 are not provided may all be floated (FL).

The second charging channel 230*ch*2 and the third charging channel 230*ch*3 are illustrated as being floated (FL) in the first section t1. That is, two floated (FL) channels (hereinafter, referred to as the gap channels) exist between channels to which the first charging signal SG1 is provided and channels to which the second charging signal SG2 is provided. As the number of gap channels is increased, the intensity of the magnetic field formed by the current I may be increased. Accordingly, the number of gap channels may vary depending on usage conditions of the electronic device 1000 or the type of pen PN.

In the second section t2, the second charging signal SG2 may be provided to the first charging channel 230*ch*1 and the second charging channel 230*ch*2, and the first charging signal SG1 may be provided to the fifth charging channel 230*ch*5 and the sixth charging channel 230*ch*6. The second line segment 232*t*, the third line segment 233*t*, and the remaining charging channels 230*ch*3, 230*ch*4, and 230*ch*7 to which the first charging signal SG1 and the second charging signal SG2 are not provided may all be floated (FL).

Thereafter, in the third to n-th sections t3 to tn, the second charging signal SG2 and the first charging signal SG1 may be provided while being shifted by one channel.

According to the present disclosure, the first charging signal SG1 may be provided to two channels, and the second charging signal SG2 may be provided to two channels. When the same signal is provided to a plurality of channels, an effect of decreasing resistance may be obtained. Accordingly, the power consumption of the sensor layer 200 may be relatively reduced as the resistance is decreased.

In an unfolded state, the sensor driver 200C may perform a scan operation for charging the pen PN on all of the sensing regions 200A1 to 200A5.

Figure 19:
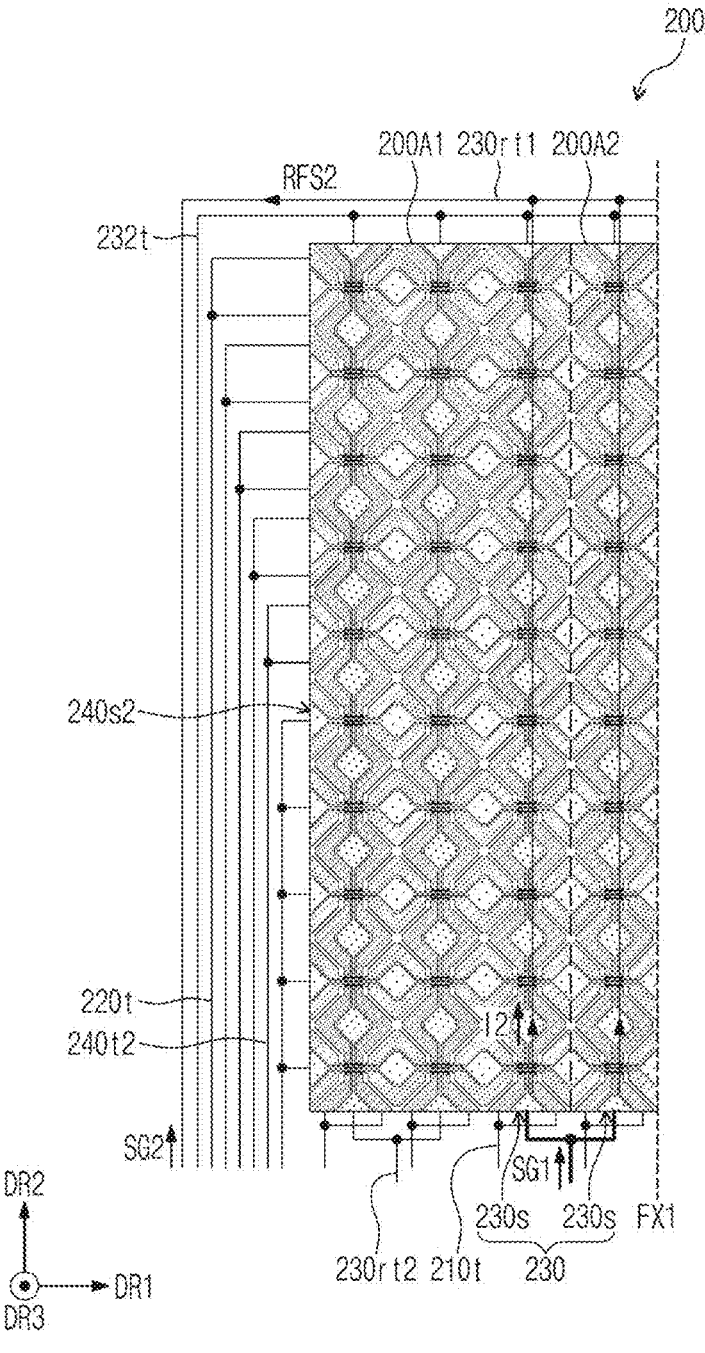
FIG. 19 is a view for explaining a charging drive mode of a third sub-mode according to some embodiments of the present disclosure.

FIG. 19 is a view for explaining a charging drive mode of the third sub-mode according to some embodiments of the present disclosure, and FIG. 20 is a table showing signals provided to the sensor layer according to some embodiments of the present disclosure. In describing FIG. 19, the components described with reference to FIG. 7 will be assigned with the same reference numerals, and some repeated descriptions thereof may be omitted.

Referring to FIGS. 5, 12, 19, and 20, the third sub-mode MD2-3 may operate when it is determined in the first sub-mode MD2-1 that the sensor layer 200 is in a folded state.

When the sensor layer 200 is in the folded state, the display layer 100 may have the second display region DA2 (refer to FIG. 2) that has a smaller area than the first display region DA1 (refer to FIG. 1), and the area by which the sensor layer 200 is exposed to the outside may correspond to the first sensing region 200A1 and at least a portion of the second sensing region 200A2. In this case, the area by which the sensor layer 200 is exposed to the outside in the folded state may be smaller than the area by which the sensor layer 200 is exposed to the outside in the unfolded state.

In the charging drive mode of the third sub-mode MD2-3, the sensor driver 200C may apply the first charging signal SG1 to the third trace line 230*rt*1 and/or at least one of the fifth trace lines 230*rt*2 and may apply the second charging signal SG2 to at least one other fifth trace line 230*rt*2.

Because the first charging signal SG1 and the second charging signal SG2 are applied to the plurality of first auxiliary electrodes 230*s* through the third trace line 230*rt*1 and/or at least two fifth trace lines 230*rt*2, a current I2 may have a current path RFS2 along which the current I2 flows through at least one fifth trace line 230*rt*2, the plurality of first auxiliary electrodes 230*s*, and at least one other fifth trace line 230*rt*2. Furthermore, because the first charging signal SG1 and the second charging signal SG2 are square-wave signals having an inverse phase relationship, the direction of the current I2 may be periodically varied. The current path RFS2 may have a coil shape. In the charging drive mode of the third sub-mode MD2-3, the resonance circuit of the pen PN may be charged by the current path RFS2.

The table of FIG. 20 shows signals provided to the second line segment 232*t* and the first to sixth charging channels 230*ch*1, 230*ch*2, 230*ch*3, 230*ch*4, 230*ch*5, and 230*ch*6 (hereinafter, 230*ch*1 to 230*ch*6) or states thereof in a first sections t1-1 and a second section t2-1. The first to sixth charging channels 230*ch*1 to 230*ch*6 may correspond to the third electrodes 230, respectively, which are located in the first sensing region 200A1.

In FIG. 20, the six channels are illustrated as an example. However, the number of channels is not limited thereto. For example, the number of channels may correspond to the number of third electrodes 230 located in at least one sensing region displayed to the outside in the folded state.

In the charging drive mode of the third sub-mode MD2-3, the first charging signal SG1 or the second charging signal SG2 may be provided to some of the channels included in the sensor layer 200. That is, in the charging drive mode of the third sub-mode MD2-3, the sensing regions 200A1 and 200A2 of the sensor layer 200 that correspond to the second display region DA2 (refer to FIG. 2) of the display layer 100 may be scanned.

In the first section t1-1, the second charging signal SG2 may be provided to the second line segment 232*t* and the first charging channel 230*ch*1, and the first charging signal SG1 may be provided to the fourth charging channel 230*ch*4 and the fifth charging channel 230*ch*5. The remaining charging channels 230*ch*2, 230*ch*3, and 230*ch*6 to which the first charging signal SG1 and the second charging signal SG2 are not provided may all be floated (FL).

In the second section t2-1, the second charging signal SG2 may be provided to the first charging channel 230*ch*1 and the second charging channel 230*ch*2, and the first charging signal SG1 may be provided to the fifth charging channel 230*ch*5 and the sixth charging channel 230*ch*6. The second line segment 232*t* and the remaining charging channels 230*ch*3 and 230*ch*4 to which the first charging signal SG1 and the second charging signal SG2 are not provided may all be floated (FL).

According to the present disclosure, in the folded state, the sensor driver 200C may perform a scan operation for charging the pen PN only on some sensing regions 200A1 and 200A2 exposed to the outside among the sensing regions 200A1 to 200A5. In the folded state, the charging signals SG1 and SG2 may not be provided to the plurality of first auxiliary electrodes 230*s* located in a partial area of the active region FS (refer to FIG. 1) that does not overlap the second display region DA2 (refer to FIG. 2). Accordingly, the power consumption of the electronic device 1000 may be relatively reduced.

A first number of times that the charging signals SG1 and SG2 are provided in the folded state and a second number of times that the charging signals SG1 and SG2 are provided in the unfolded state may be different from each other.

The first number of times may be less than the second number of times. For example, referring to FIG. 20, the first number of times may be equal to 2, and referring to FIG. 18, the second number of times may be equal to n. Here, "n" may be a natural number greater than 5.

The operating time of the charging drive mode of the second sub-mode MD2-2 may be defined as the first to n-th sections t1 to tn (refer to FIG. 18).

The operating time of the charging drive mode of the third sub-mode MD2-3 may be defined as the first and second sections t1-1 and t2-1.

The operating time of the charging drive mode of the second sub-mode MD2-2 may be longer than the operating time of the charging drive mode of the third sub-mode MD2-3. In this case, the operating time PD1 of the second sub-mode MD2-2 may be longer than the operating time PD2 of the third sub-mode MD2-3 because the operating time of the pen sensing drive mode is the same.

In addition, the number of first auxiliary electrodes 230s to which the charging signals SG1 and SG2 are provided in the folded state may be smaller than the number of first auxiliary electrodes 230s to which the charging signals SG1 and SG2 are provided in the unfolded state. For example, in the unfolded state, the charging signals SG1 and SG2 may be provided to all of the plurality of first auxiliary electrodes 230s located in the sensing regions 200A1 to 200A6, and in the folded state, the charging signals SG1 and SG2 may be provided only to the plurality of first auxiliary electrodes 230s located in the first sensing region 200A1 and the second sensing region 200A2.

According to the present disclosure, the sensor driver 200c may drive the sensor layer 200 in the first sub-mode MD2-1, the second sub-mode MD2-2, and the third sub-mode MD2-3. In the first sub-mode MD2-1, the sensor driver 200C may determine whether the sensor layer 200 is folded or not. When it is determined in the first sub-mode MD2-1 that the sensor layer 200 is in an unfolded state, the sensor driver 200c may drive the sensor layer 200 in the second sub-mode MD2-2. In the second sub-mode MD2-2, the sensor driver 200C may perform the charging drive mode using all of the plurality of third electrodes 230. When it is determined in the first sub-mode MD2-1 that the sensor layer 200 is in a folded state, the sensor driver 200c may drive the sensor layer 200 in the third sub-mode MD2-3. In the third sub-mode MD2-3, the sensor driver 200C may perform the charging drive mode using some third electrodes 230 exposed to the outside among the plurality of third electrodes 230. That is, in the folded state, the sensor driver 200c may perform an operation of charging the pen PN using a relatively small number of third electrodes 230. Accordingly, the electronic device 1000 with relatively reduced power consumption may be provided.

Figure 21:
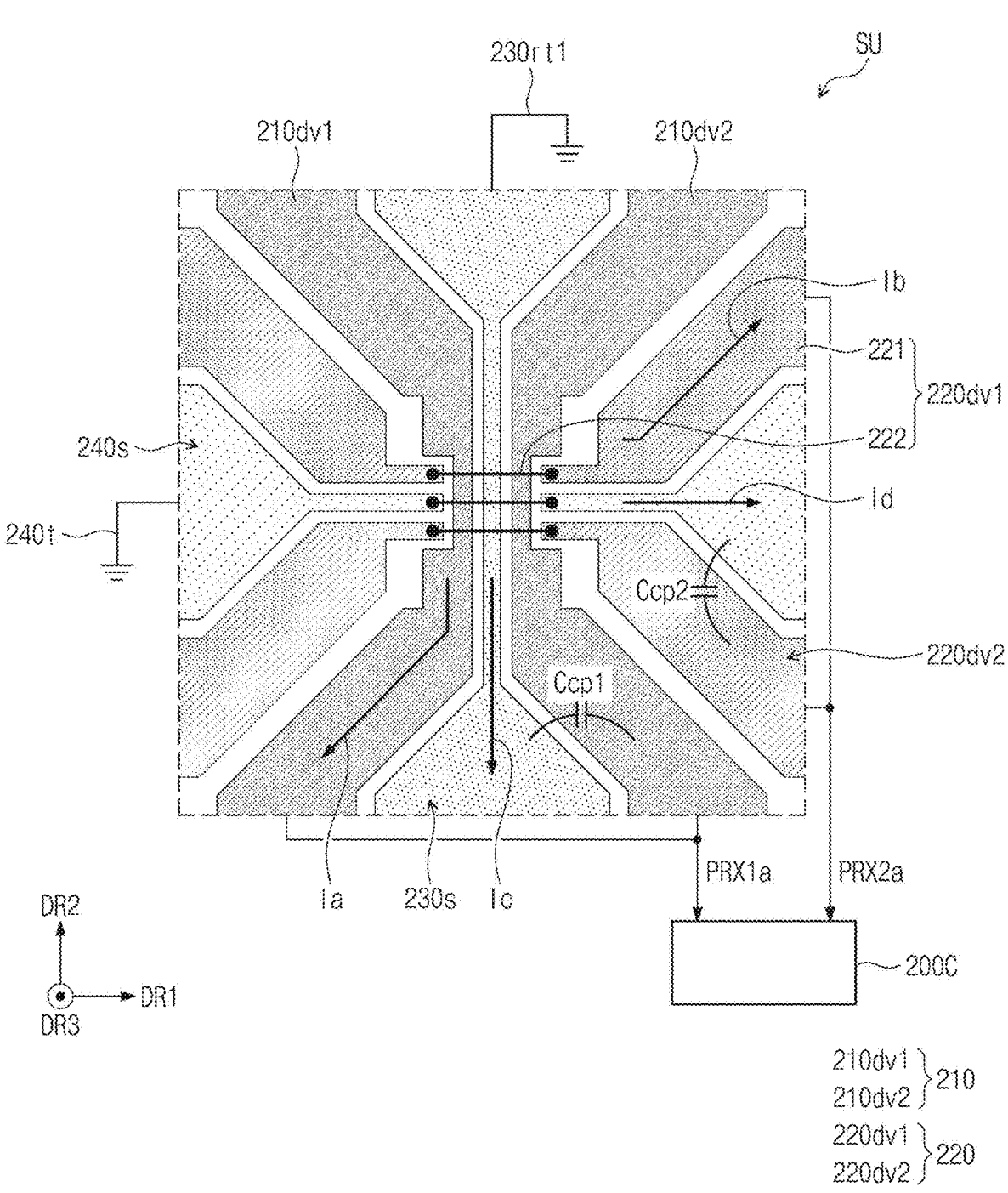
FIG. 21 is a view for explaining pen sensing drive modes of the second sub-mode and the third sub-mode according to some embodiments of the present disclosure.

FIG. 21 is a view for explaining the pen sensing drive modes of the second sub-mode and the third sub-mode according to some embodiments of the present disclosure.

Referring to FIGS. 5, 12, and 21, the RLC resonance circuit of the pen PN may emit a magnetic field having a certain resonant frequency while discharging charged charges. Due to the magnetic field provided by the pen PN, a first induced current Ia may be generated in the first electrode 210, and a second induced current Ib may be generated in the second electrode 220. In addition, a third induced current Ic may be generated in the first auxiliary electrode 230s of the third electrode 230, and a fourth induced current Id may be generated in the second auxiliary electrode 240s of the fourth electrode 240.

A first coupling capacitor Ccp1 may be formed between the first auxiliary electrode 230s and the first electrode 210, and a second coupling capacitor Ccp2 may be formed between the second auxiliary electrode 240s and the second electrode 220. The third induced current Ic may be transferred to the first electrode 210 through the first coupling capacitor Ccp1, and the fourth induced current Id may be transferred to the second electrode 220 through the second coupling capacitor Ccp2.

The sensor driver 200c may receive a first reception signal PRX1a based on the first induced current Ia and the third induced current Ic from the first electrode 210 and may receive a second reception signal PRX2a based on the second induced current Ib and the fourth induced current Id from the second electrode 220. The sensor driver 200C may detect the input coordinates of the pen PN, based on the first reception signal PRX1a and the second reception signal PRX2a.

The sensor driver 200C may receive the first reception signal PRX1a from the first electrodes 210 and may receive the second reception signal PRX2a from the second electrodes 220. In this case, the first ends of the third electrodes 230 and the fourth electrodes 240 may all be floated. Accordingly, compensation of a sensing signal may be maximized by the coupling between the first electrodes 210 and the third electrodes 230 and the coupling between the second electrodes 220 and the fourth electrodes 240. In addition, the second ends of the third electrodes 230 and the fourth electrodes 240 may be grounded or floated. Accordingly, the third induced current Ic and the fourth induced current Id may be sufficiently transferred to the first electrodes 210 and the second electrodes 220 by the coupling between the first electrodes 210 and the third electrodes 230 and the coupling between the second electrodes 220 and the fourth electrodes 240.

As described above, the sensor driver may drive the sensor layer in the first sub-mode, the second sub-mode, and the third sub-mode. In the first sub-mode, the sensor driver may determine whether the sensor layer is folded or not. When it is determined in the first sub-mode that the sensor layer is in an unfolded state, the sensor driver may drive the sensor layer in the second sub-mode. In the second sub-mode, the sensor driver may perform the charging drive mode using all of the plurality of third electrodes. When it is determined in the first sub-mode that the sensor layer is in a folded state, the sensor driver may drive the sensor layer in the third sub-mode. In the third sub-mode, the sensor driver may perform the charging drive mode using some third electrodes exposed to the outside among the plurality of third electrodes. That is, in the folded state, the sensor driver may perform an operation of charging the pen using a relatively small number of third electrodes. Accordingly, the electronic device with relatively reduced power consumption may be provided.

While aspects of some embodiments of the present disclosure have been described with reference to embodiments thereof, it will be apparent to those of ordinary skill in the art that various changes and modifications may be made thereto without departing from the spirit and scope of embodiments according to the present disclosure as set forth in the following claims, and their equivalents.

What is claimed is:

1. An electronic device comprising:
a display layer configured to operate in a folded state or an unfolded state, the display layer having an active region defined therein, wherein the active region includes a folding region and a plurality of non-folding regions spaced apart from each other with the folding region therebetween;
a sensor layer on the display layer; and
a sensor driver configured to operate in a charging drive mode to transmit a charging signal to the sensor layer, wherein the sensor layer includes:

a plurality of first electrodes arranged in a first direction and extending in a second direction crossing the first direction;

a plurality of second electrodes arranged in the second direction and extending in the first direction;

a plurality of first auxiliary electrodes arranged in the first direction and extending in the second direction and overlapping the plurality of first electrodes; and a plurality of second auxiliary electrodes arranged in the second direction and extending in the first direction and overlapping the plurality of second electrodes, wherein the sensor driver sequentially provides the charging signal to the plurality of first auxiliary electrodes in the first direction during the charging drive mode, and wherein a number of times that the charging signal is provided in the folded state and a number of times that the charging signal is provided in the unfolded state are different from each other, wherein in the folded state, the display layer has a first display region, and in the unfolded state, the display layer has a second display region, and wherein in the folded state, the charging signal is not provided to the plurality of first auxiliary electrodes in a partial area of the active region configured so as not to overlap the first display region.

2. The electronic device of claim 1, wherein in the folded state, at least one of the plurality of non-folding regions of the display layer is exposed to the outside.

3. The electronic device of claim 1, wherein the second display region has a larger area than the first display region.

4. The electronic device of claim 1, wherein the sensor layer is configured to operate in a first mode to sense a touch or to operate in a second mode to sense an input device, wherein the second mode includes:

a first sub-mode in which the folded state or the unfolded state of the sensor layer is identified;

a second sub-mode configured to operate in the unfolded state; and a third sub-mode configured to operate in the folded state.

5. The electronic device of claim 4, wherein each of the second sub-mode and the third sub-mode includes the charging drive mode.

6. The electronic device of claim 5, wherein an operating time of the second sub-mode is longer than an operating time of the third sub-mode.

7. The electronic device of claim 4, wherein a folding axis extending in the second direction is defined in the folding region, wherein the sensor driver includes a folding recognition unit, and wherein the folding recognition unit is electrically connected with a first electrode adjacent to the folding axis in the first direction among the plurality of first electrodes.

8. The electronic device of claim 7, wherein the folding recognition unit includes a driving unit configured to generate a transmission signal and a sensing unit configured to receive a reception signal, wherein in the first sub-mode, the folding recognition unit is configured to operate as the sensing unit, and wherein in the first mode, the second sub-mode, and the third sub-mode, the folding recognition unit is configured to operate as the driving unit.

9. The electronic device of claim 1, wherein a number of first auxiliary electrodes to which the charging signal is provided in the folded state is smaller than a number of first auxiliary electrodes to which the charging signal is provided in the unfolded state.

10. The electronic device of claim 1, wherein the charging signal includes a first charging signal and a second charging signal, and wherein the first charging signal and the second charging signal have phases opposite to each other.

11. The electronic device of claim 10, wherein between at least one first auxiliary electrode to which the first charging signal is provided among the plurality of first auxiliary electrodes and at least one other first auxiliary electrode among the plurality of first auxiliary electrodes configured to receive the second charging signal, at least one of the remaining first auxiliary electrodes is located.

12. The electronic device of claim 11, wherein among the plurality of first auxiliary electrodes, at least one first auxiliary electrode to which the first charging signal and the second charging signal are not provided is floated.

13. An electronic device comprising:

a display layer configured to operate in a folded state or an unfolded state, the display layer having an active region defined therein, wherein the active region includes a folding region and a plurality of non-folding regions spaced apart from each other with the folding region therebetween;

a sensor layer on the display layer; and a sensor driver configured to operate in a charging drive mode to transmit a charging signal to the sensor layer, wherein the sensor layer includes:

a plurality of first electrodes arranged in a first direction and extending in a second direction crossing the first direction;

a plurality of second electrodes arranged in the second direction and extending in the first direction;

a plurality of first auxiliary electrodes arranged in the first direction and extending in the second direction and overlapping the plurality of first electrodes; and a plurality of second auxiliary electrodes arranged in the second direction and extending in the first direction and overlapping the plurality of second electrodes, and wherein a number of first auxiliary electrodes to which the charging signal is provided in the folded state is smaller than a number of first auxiliary electrodes to which the charging signal is provided in the unfolded state, wherein in the folded state, the display layer has a first display region, and in the unfolded state, the display layer has a second display region, wherein in the folded state, the charging signal is not provided to the plurality of first auxiliary electrodes in a partial area of the active region configured so as not to overlap the first display region.

14. The electronic device of claim 13, wherein in the folded state, at least one of the plurality of non-folding regions of the display layer is exposed to the outside.

15. The electronic device of claim 13, wherein the second display region has a larger area than the first display region.

16. The electronic device of claim 13, wherein the charging signal includes a first charging signal and a second charging signal, and wherein the first charging signal and the second charging signal have phases opposite to each other.

17. The electronic device of claim 16, wherein between at least one first auxiliary electrode to which the first charging signal is provided among the plurality of first auxiliary electrodes and at least one other first auxiliary electrode to which the second charging signal is provided among the plurality of first auxiliary electrodes, at least one of the remaining first auxiliary electrodes is located.

18. The electronic device of claim 17, wherein among the plurality of first auxiliary electrodes, at least one first auxiliary electrode to which the first charging signal and the second charging signal are not provided is floated.

* * * * *